United States Patent

Watanabe et al.

[11] Patent Number: 5,221,497
[45] Date of Patent: Jun. 22, 1993

[54] ELONGATED-SHAPED SILICA SOL AND METHOD FOR PREPARING THE SAME

[75] Inventors: Yoshitane Watanabe; Mikio Ando; Kenji Tanimoto, all of Funabashi; Tsutomu Kagamimiya; Makoto Kawashima, both of Kimitsu, all of Japan

[73] Assignee: Nissan Chemical Industries, Ltd., Tokyo, Japan

[21] Appl. No.: 746,634

[22] Filed: Aug. 19, 1991

Related U.S. Application Data

[62] Division of Ser. No. 324,446, Mar. 16, 1989, abandoned.

[30] Foreign Application Priority Data

Mar. 16, 1988 [JP] Japan .................................. 63-62849

[51] Int. Cl.⁵ .............................................. B01J 13/00
[52] U.S. Cl. .............................. 252/313.2; 252/313.1; 252/315.6; 106/287.34
[58] Field of Search ............... 252/313.1, 313.2, 315.6; 106/287.34

[56] References Cited

U.S. PATENT DOCUMENTS

| | | | |
|---|---|---|---|
| 2,244,325 | 6/1941 | Bird | 252/313.2 |
| 2,657,183 | 10/1953 | Bechtold | 252/313.2 |
| 2,680,721 | 6/1954 | Broge et al. | 252/313.2 |
| 2,757,073 | 7/1956 | Drexel et al. | 252/313.2 |
| 2,892,797 | 6/1959 | Alexander et al. | 252/313.2 |
| 2,900,348 | 8/1959 | Ahlberg et al. | 252/313.2 |
| 3,351,561 | 11/1967 | Albrecht et al. | 252/309 |
| 3,948,799 | 4/1976 | Schaefer | 106/287.34 |
| 4,343,717 | 8/1982 | Lok | 252/313.2 |

OTHER PUBLICATIONS

Ogino et al, "Particle Growth in Silica Dispersion," Journal of Colloid and Interface Science, V. 56, No. 3, Sep. 1976, pp. 629–630.

Koppel, "Analysis of Macromolecular Polydispersity," Journal of Chemical Physics, V. 57, No. 11, Dec. 1972, pp. 4814–4820.

Primary Examiner—Robert L. Stoll
Assistant Examiner—Daniel S. Metzmaier
Attorney, Agent, or Firm—Oliff & Berridge

[57] ABSTRACT

A method for preparing a stable silica sol having an $SiO_2$ concentration of 40% or less, the colloidal particles of said silica having a particle size of 40 to 500 nm, as measured by dynamic light-scattering and having an elongated shape having a thickness of 5 to 40 nm and an elongation of 5 to 30 times the thickness in only one plane, the method comprising the steps (a), (b) and (c): (a) mixing an aqueous solution of Ca or Mg salt with an aqueous solution of active silicic acid having an $SiO_2$ concentration of 1 to 6% and a pH value of 2 to 5, or with an aqueous acidic silica sol having a particle size of 3 to 30 nm, an $SiO_2$ concentration of 0.5 to 25% and a pH value of 1 to 5 in a weight ratio of 1500 to 10000 ppm of (CaO or MgO)/$SiO_2$; (b) mixing an alkali metal hydroxide with the solution obtained by step (a) in a molar ratio of 20 to 300 as $SiO_2/M_2O$, wherein M represents an alkali metal atom; and (c) heating the mixture obtained by step (b) at 60° to 300° C. for 0.5 to 40 hours.

32 Claims, 4 Drawing Sheets

100 mμ

100 mμ

100 mμ

100 mµ

ELONGATED-SHAPED SILICA SOL AND METHOD FOR PREPARING THE SAME

This is a Division of application Ser. No. 07/324,446 filed Mar. 16, 1989 now abandon.

BACKGROUND OF THE INVENTION

1. Field of the Invention

The present invention relates to a novel silica sol and a method for preparing the same. Specifically, the novel silica sol is characterized by a particular shape of colloidal silica particle and displays an excellent filming or coating property after being coated and dried on a solid article and therefore it is utilized as a coating composition and in other various fields.

2. Description of Related Art

A silica sol has a general property that it finally gels from its low viscosity state via its high viscosity state. Accordingly, for silica sol products having the same $SiO_2$ content, ones having a lower viscosity are evaluated to have a higher stability than others having a higher viscosity. In addition, silica sol containing colloidal silica particles with a more spherical shape has been known to have a lower viscosity. Under this situation, there have heretofore been various proposals for efficiently preparing spherical colloidal silica sols, but there is no proposal up to the present for improving the characteristic of a silica sol by controlling the shape of the colloidal silica particles as dispersed in the silica sol to be non-spherical.

Regarding the shape of the conventional colloidal silica particles, U.S. Pat. No. 2,680,721 mentions three typical types of particles in the drawings as attached thereto. The first is a spherical one as mentioned above, which is shown in FIG. 1 thereof; the second is a non-spherical one having a ratio of the major axis to the minor axis of almost from 2 to 3, which is shown in FIG. 2, bottom view thereof; and the third is an amorphous one, which is shown in FIG. 3, bottom view thereof. The random-shaped particles of the third type are ones resulting from growth of the fragments formed by cleavage of the chain of a three-dimensional network structure of particles of very small size derived from chain-like linkage of smaller silica particles, as so explained in the said U.S. Pat. No. 2,680,721. When attention is paid to one particle of such type, it is noted that it has a non-spherical shape but the shape is not controlled.

The above-mentioned U.S. Pat. No. 2,680,721 has disclosed a method of forming a silica sol comprising spherical colloidal silica particles where a monovalent base is added to spherical silica sol having a diameter of 5 m$\mu$ (milli micron) or more so that the pH value of the sol may be within the range of from 7 to 10.5 and the sol is heated at 160° to 300° C. in the absence of electrolytes.

U.S. Pat. No. 2,900,348 has disclosed a method of forming a silica sol where a gel formed by adding an acid to an aqueous solution of water glass is washed with water, an alkali is added to the gel so that the gel may have a pH value of from 9 to 9.5, and the gel is then heated at 95° to 100° C. The said method is a so-called peptization method, and the silica sol prepared by the method has a shape of the above-mentioned second or third type.

Silica sols comprising spherical colloidal silica particles having a particle diameter of from 4 to 150 m$\mu$ are highly stable and are therefore used in various fields. However, the spherical particles which give good dispersibility to the sol would often have some practical problems in that they frequently cause cracking of the film to be formed from the silica sol containing composition and migration of colloidal silica particles is generated in a composition comprising the silica sol and ceramic fibers when the composition is dried so that dusting on the surface of the dried article is frequently caused. In order to solve such problems, a means of adding some other components to the silica sol has been employed, but sufficient improvement to the problems has not been attained.

The silica sol obtainable by the said conventional peptization method does not have a sufficient stability, and, as the case may be, it would often form a precipitate of silica during storage thereof. Although the colloidal silica particles in the said sol are non-spherical, they also have the same problems as those in the case of the silica sol comprising the above-mentioned spherical colloidal silica particles.

SUMMARY OF THE INVENTION

One object of the present invention is to provide stable silica sols having improved properties by modifying the shape of colloidal silica particles.

Another object of the present invention is to provide a method to efficiently prepare such improved silica sol.

The silica sol of the present invention is stable and has an $SiO_2$ concentration of 40% by weight or less. The sol contains amorphous colloidal silica particles dispersed in a liquid medium, and the shape of the particles is characterized in that the particles each has a particle size ($D_1$) of from 40 to 500 m$\mu$ (milli micron), as measured by dynamic light-scattering method, and, when observed with an electronic microscope, they each have an elongated shape elongated in only one plane and having a uniform thickness along the elongation within the range of from 5 to 40 m$\mu$. The elongation degree of the particles according to the present invention, is further defined in terms of the size ratio $D_1/D_2$, where $D_2$ means the particle diameter ($D_2$ m$\mu$) as calculated from the formula of $D_2 = 2720/S$ in which S represents a specific surface area (m$^2$/g) of the particles measured by nitrogen gas-adsorbing method (hereinafter referred to as BET method) and the silica sol of the present invention has a value of from 5 to 30 of the elongation degree in terms of $D_1/D_2$.

As one embodiment of the present invention, the colloidal silica sol, in which each particle has a thickness of from 5 to 20 m$\mu$, as measured with an electronic microscope and a particle size of from 40 to 300 m$\mu$ as measured by dynamic light-scattering method and the ratio of $D_1/D_2$ is from 5 to 30, is efficiently prepared by a method comprising the following steps (a), (b) and (c):

(a) mixing an aqueous solution containing a water-soluble calcium salt or magnesium salt or a mixture of the calcium salt and the magnesium salt with an aqueous colloidal liquid of an active silicic acid containing from 1 to 6% by weight of $SiO_2$ and having a pH value of from 2 to 5 in an amount of from 1500 to 8500 ppm as a weight ratio of CaO or MgO or a mixture of CaO and MgO with respect to $SiO_2$ of the active silicic acid;

(b) mixing an alkali metal hydroxide or a water-soluble organic base or a water-soluble silicate of the alkali metal hydroxide and organic base with the aqueous solution obtained in step (a) in a molar ratio of $SiO_2/M_2O$ from 20 to 200, where $SiO_2$ indicates the total silica content derived from the active silicic acid and the silica content of the silicate, and M indicates the alkali metal atom or organic base molecule; and (c) heating the mixture obtained in step (b) at 60° to 250° C. for 0.5 to 40 hours.

As another embodiment of the present invention, the silica sol containing the colloidal silica particles the same as or larger than those in the silica sol obtainable by the first method, in which each particle has a thickness of from 5 to 40 mµ as measured with an electronic microscope and has a particle size of from 40 to 500 mµ as measured by dynamic light-scattering method and the ratio of $D_1/D_2$ is from 5 to 30, is efficiently prepared by a method comprising the following steps (a'), (b') and (c'):

(a') mixing an aqueous solution containing a water-soluble calcium salt or magnesium salt or a mixture of the calcium salt and the magnesium salt with an aqueous acidic silica sol containing colloidal silica particles having an average particle size of from 3 to 30 mµ in a content of from 0.5 to 25% by weight of $SiO_2$ and having a pH value of from 1 to 5, in an amount of from 0.15 to 1.00% by weight of CaO, MgO or a mixture of CaO and MgO to $SiO_2$ of the acidic sol;

(b') mixing an alkali metal hydroxide or a water-soluble organic base or a water-soluble silicate of the alkali metal hydroxide and organic base with the liquid as obtained in step (a') in a molar ratio of $SiO_2/M_2O$ from 20 to 300, where $SiO_2$ indicates the total silica content derived from the said acidic silica sol and the silica content derived from the silicate, and M indicates the alkali metal atom or organic base molecule; and (c') heating the mixture obtained in step (b') at 60° to 300° C. for 0.5 to 40 hours.

DETAILED DESCRIPTION OF THE INVENTION

Figure 1:
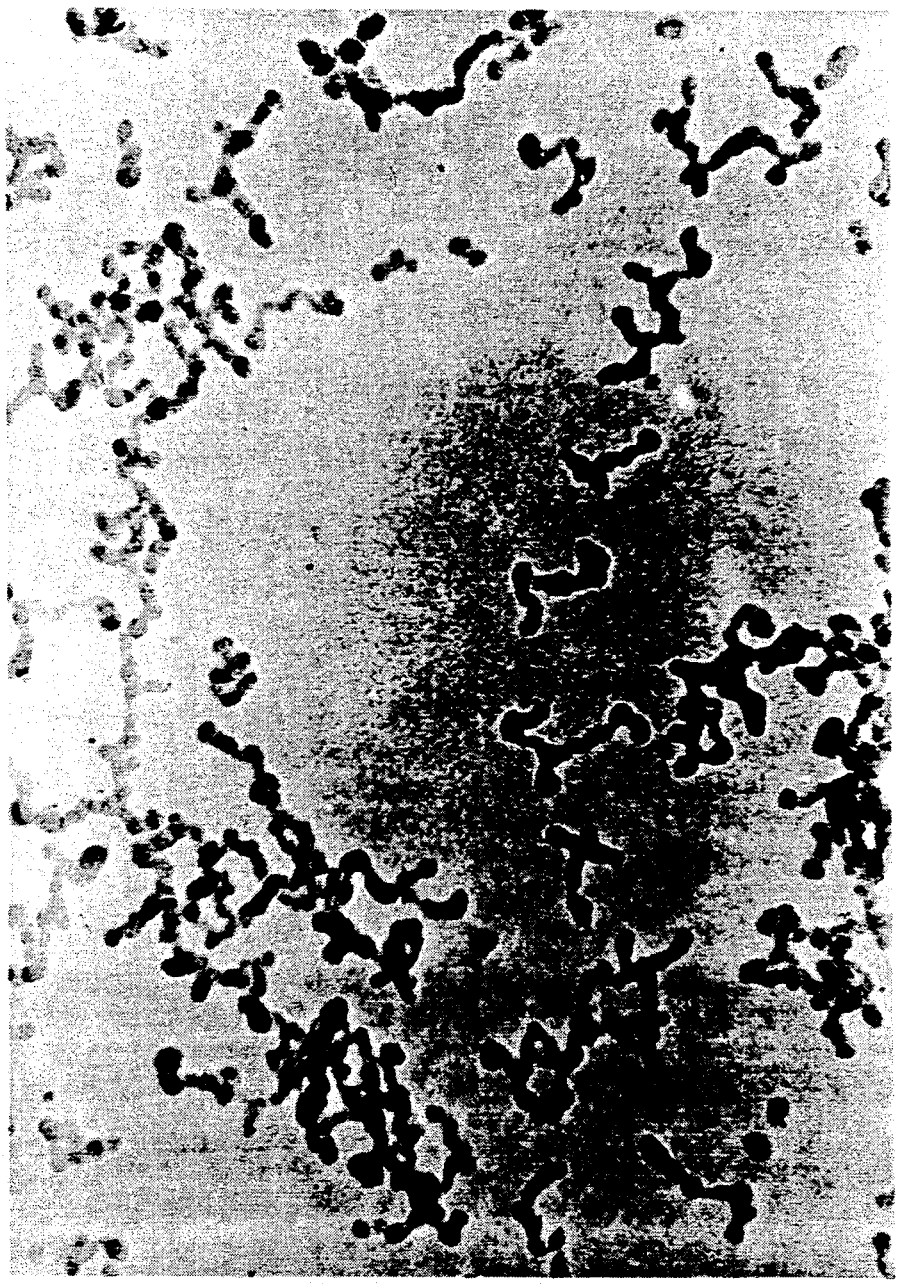
FIG. 1 is a 200,000 magnification-transmission electro-microscopic photograph showing the particle structure of the colloidal silica of the concentrated sol obtained in Example 1 of the present invention.

With reference to FIG. 1, the shape of the colloidal silica particles in the sol of the present invention can be observed in a photograph taken with an electronic microscope. A number of the colloidal silica particles in the sol commonly have an elongated shape, although the shape thereof is not limited to be the same. The numerous colloidal silica particles are roughly classified into four groups of shapes; the first almost straight, the second angled, the third branched and the forth having ring, though the proportions thereof are difficult to be represented by accurate numerals. In accordance with the photograph, however, it is noted that the amounts of the angled type and the branched type occupy major portions of the sol. When attention is paid to one particle, it is noted that the thickness of the particle from one end to the other end is almost uniform along the elongation. Such uniform thickness of the particle is caused by the method of the preparation of the sol, and the thickness itself of the particle also is controlled by the process for the preparation of the sol based upon the experimental rule in the preparation. A number of colloidal silica particles in the sol prepared by a determined method have an almost determined thickness. The thickness of the colloidal silica particles of the sol obtainable by the method of the present invention falls within the range of from 5 to 40 mµ. However, the length of the numerous colloidal silica particles in the sol as prepared by a determined method is not determined. From the photograph in FIG. 1 showing the particles, it is noted that the length of the particles is 3 times or more of the thickness thereof, and in general, almost all the particles in the sol have a length which is several times to several tens of times of the thickness thereof.

The colloidal silica particles in the sol of the present invention have, in addition to the elongation, another characteristic feature. That is, the elongation of each particle in the sol exists in the same plane, irrespective of the shapes. Accordingly, all the particles, even though they have different shapes, may be laid on the same plane with the height corresponding to the thickness of the particles, provided that the particles do not overlap with one another. As shown in FIG. 1, in the electro-microscopic photograph of the colloidal silica particles in the sol of the present invention, in general, it is noted that most of the colloidal silica particles overlap with one another and therefore one end and the other end of one particle hardly can be observed definitely so that the length of the particle could hardly be determined. In addition, according to the photograph in FIG. 1, it seems also difficult to determine whether or not the particle has also another elongation in the direction vertical to the plane as a three-dimensional structure. However, if the particle had such an elongation as a three-dimentional structure, the silica sol would display a characteristic property which is specific to the existence of a three-dimensional structure or a near structure, for example, an extremely high viscosity or non-fluidity, and therefore would be unstable.

As opposed to this, the sol of the present invention is a stable and middle-viscous liquid. Accordingly, it should be said that the colloidal silica particles in the sol of the present invention are not elongated in the three-dimensional direction. The plane in which the elongation of the colloidal particles of silica in the sol of the present invention exists, does not mean a purely or strictly mathematically one plane, but it is rather defined by the fact that the sol according to the present invention does not display the characteristic property which is specific to a silica sol containing colloidal silica particles having a three-dimensional structure or a near structure.

The size of such colloidal particles in the sol of the present invention is inappropriate to be represented by the length which could be presumed from the photograph in FIG. 1 of the colloidal particles of silica sol but it is appropriate to be represented by the value as measured by dynamic light-scattering method where the particle size may be determined as one corresponding to the length of the particle. The particle size of the colloidal silica particles in the sol of the present invention is from 40 to 500 m$\mu$, as the mean measured by dynamic light-scattering method. The method of measuring the particle size by dynamic light-scattering method is explained in detail in *Journal of Chemical Physics*, Vol. 57, No. 11 (December 1972), page 4814. For instance, the particle diameter may easily be determined by the use of a commercial apparatus N$_4$ (sold by Coulter Co., USA) for dynamic light-scattering method. The particle size (D$_2$ m$\mu$) as calculated from the formula of D$_2$=2720/S where S means a specific surface area (m$^2$/g) of the particles to be measured by a conventional BET method, means the size of the suppositional spherical colloidal silica particles having the same specific surface area S (m$^2$/g) as that of the elongated colloidal silica particles. Accordingly, the ratio D$_1$/D$_2$ of the particle size (D$_1$ m$\mu$), as measured by the aforesaid dynamic light-scattering method, to the particle size (D$_2$ m$\mu$) represents the elongation degree of the elongated-shaped colloidal silica particle. Since the colloidal particles of amorphous silica in the sol of the present invention, in general, have a specific surface area of about 45 to 450 m$^2$/g, D$_2$ is calculated as from 6 to 60 m$\mu$, and usually the colloidal particles of amorphous silica of the invention have a value of 5 to 30 as the degree of elongation.

The colloidal silica particles in the sol of the present invention contain a small amount (generally from 1500 to 10000 ppm by weight or so of SiO$_2$ in the sol) of a calcium or magnesium oxide or a mixture thereof, which is derived from the method of preparing the sol, but the colloidal silica particles essentially consist of amorphous silica. As the case may be, the particles may further contain, in addition to the calcium or magnesium oxide or the mixture thereof, a small amount of oxides of other polyvalent metals. The total amount of the calcium oxide, magnesium oxide and other polyvalent metal oxides is to be from 1500 to 15000 ppm or so by weight of SiO$_2$ in the sol. Of the polyvalent metals other than calcium and magnesium, there may concretely be mentioned II-valent metals such as Sr, Ba, Zn, Sn, Pb, Cu, Fe, Ni, Co and Mn, III-valent metals such as Al, Fe, Cr, Y and Ti, and IV-valent metals such as Ti, Zr and Sn.

The silica sol of the present invention generally contains 40% by weight or less, preferably from 5 to 30% by weight, of SiO$_2$. The sol has a higher viscosity with increase of the SiO$_2$ content in the sol, and when the SiO$_2$ content in the sol is 30% by weight or less, the sol has a viscosity of from several cp to 500 cp or so. The sol has an extremely high stability and the sol involves neither precipitation of silica therein nor increase of the viscosity thereof during storage. The sol may have any one of water, organic solvent and solutions of water and a water-soluble organic solvent, as its medium. In any one of the aqueous sols having water as its medium and the organosol having an organic solvent as its medium, the colloidal silica particles are active because of the silanol group existing on the surface of the colloidal silica particle, and after removal of the solvent, the sol finally and irreversibly changes to a gel. As the organic solvents to be used as a medium of the organo-silica sol, any and every conventional one which does not interfere with the activity of the colloidal silica particles can be used. For instance, such solvents include alcohols such as methanol, ethanol, isopropanol and butanol, polyhydric alcohols such as ethylene glycol, ethers such as dimethyl ether and monomethyl ether of ethylene glycol, hydrocarbon solvents such as toluene and xylene, as well as dimethylacetamine, dimethylformamide and so on.

The silica sol of the present invention, in which the colloidal silica particles have a thickness of from 5 to 20 m$\mu$ and have a particle size of from 40 to 300 m$\mu$ as measured by dynamic light-scattering method, is first obtained as an alkaline aqueous silica sol, via the above-mentioned steps (a), (b) and (c). The colloidal aqueous liquid of an active silicic acid to be used in the step (a) is a liquid containing both a silicic acid and particles of a silicic acid polymer having a particle size of less than 3 m$\mu$, and it may easily be prepared by a known method. One preferred active silicic acid colloid-containing aqueous liquid is obtained by a conventional cationic exchange treatment of a diluted aqueous solution of a water-soluble silicate, for example, a water glass having a molar ratio of SiO$_2$/M$_2$O (where M indicates an alkali metal atom) from 1 to 4.5 or so, and generally, it contains SiO$_2$ in an amount of 6% by weight or less, preferably from 1 to 6% by weight, and has a pH value of 5 or less, preferably from 2 to 5. The pH value range of the liquid may easily be controlled, for example, by keeping back a part of the cations in the reaction system after cationic exchange treatment of the said water glass-containing aqueous solution, or by adding a small amount of an alkali metal hydroxide or a water-soluble organic base to the resulting active silicic acid-containing aqueous colloidal liquid after removal of all or a part of the cations from the cationic exchange treatment. The active silicic acid-containing aqueous colloidal liquid is unstable and has a property of easily gelling. Therefore, preferably the liquid does not contain any impurities which would accelerate the gelation and it is also preferable to use the liquid immediately after the preparation thereof. A more preferred active silicic acid-containing aqueous colloidal liquid may be obtained by introducing a diluted aqueous solution of a commercial product of sodium water glass having a molar ratio of SiO$_2$/Na$_2$O from 2 to 4 or so through a hydrogen type cationic exchange resin layer. The active silicic acid-containing aqueous colloidal liquid may contain any other components and may also contain a slight amount of any other cations and anions, provided that it gives a sol which satisfies the object of the present invention.

In step (a), a water-soluble calcium salt or magnesium salt or a mixture of the calcium salt and magnesium salt is mixed with the active silicic acid-containing aqueous colloidal liquid, preferably as an aqueous solution thereof. The amount of the calcium salt, magnesium salt or the mixture of the calcium salt and the magnesium salt to be added is from 1500 to 8500 ppm by weight to SiO$_2$ in the active silicic acid-containing aqueous colloidal liquid. Addition of such salt is preferably carried out with stirring. Although not specifically defined, the mixing temperature may be 2° to 50° C. and the mixing time may be 5 to 30 minutes. As examples of the calcium salt and magnesium salt to be added, there may be mentioned inorganic acid salts and organic acid salts of calcium and magnesium, such as calcium and magnesium chlorides, nitrates, sulfates, sulfamates, formates and acetates. The calcium salts and magnesium salts may be used as a mixture thereof. The concentration of the aqueous solution of said salts to be added is not specifically limited but it may be from 2 to 20% by weight or so. Preferably the active silicic acid-containing aqueous colloidal liquid may contain polyvalent metal components other than the said calcium and magnesium components, to form a sol. As examples of the polyvalent metals other than calcium and magnesium, there may be mentioned II-valent, III-valent and IV-valent metals such as Sr, Ba, Zn, Sn, Al, Pb, Cu, Fe, Ni, Co, Mn, Cr, Y, Ti and Zr. The amount of the polyvalent metal components (other than Ca and Mg components) to be added to the colloidal liquid is preferably from 10 to 80% by weight to CaO and/or MgO, as their polyvalent metal oxides, when the amount of the calcium salt and/or the magnesium salt added to step (a) is expressed in terms of the corresponding amount of CaO and/or MgO.

When the above-mentioned polyvalent metal components still remain in the active silicic acid-containing aqueous colloidal liquid obtained by cationic exchange treatment of the aforesaid diluted aqueous solution of water glass, the polyvalent metal components are to be calculated into oxide and reckoned in the amount of from 10 to 80% by weight. The polyvalent metal components of the remainder are preferably added to the active silicic acid-containing aqueous colloidal liquid together with the calcium salt and/or magnesium salt, in the form of water-soluble salts of the said polyvalent metals. As preferred examples of such polyvalent metal salts, there are mentioned inorganic acid salts and organic acid salts such as chlorides, nitrates, sulfates, sulfamates, formates and acetates. In addition, salts of zincates, stannates, aluminates and plumbates, and salts such as sodium aluminate or sodium stannate, may also be used.

The above-mentioned calcium salt, magnesium salt and polyvalent metal salts to be added are preferably uniformly mixed with the active silicic acid-containing aqueous colloidal liquid, and in general, the salts are added in the form of an aqueous solution itself.

In step (b), an alkali metal hydroxide or a water-soluble organic base or a water-soluble silicate of the alkali metal hydroxide or organic base is added to the aqueous solution obtained in the above-mentioned step (a). The addition is preferably effected as soon as possible immediately after the completion of the above-mentioned step (a), with stirring. Although not specifically limited, the temperature may be 2° to 50° C. or so and the time may be 5 to 30 minutes or so in the mixing procedure. It is preferred that the alkali metal hydroxide or water-soluble organic base or water-soluble silicate of the alkali metal hydroxide or organic base is uniformly mixed with the aqueous solution obtained in step (a) and the former is added to the latter directly or in the form of an aqueous solution thereof. Usable alkali metal hydroxides include, for example, sodium, potassium and lithium hydroxides. Usable organic bases include, for example, quaternary ammonium hydroxides such as tetraethanolammonium hydroxide, monomethyltriethanolammonium hydroxide and tetramethylammonium hydroxide, amines such as monoethanolamine, diethanolamine, triethanolamine, N,N-dimethylethanolamine, N-($\beta$-aminomethyl) ethanolamine, N-methylethanolamine, monopropanolamine and morpholine, as well as other basic nitrogen-containing organic compounds. As the water-soluble silicates of the compounds, there may be mentioned, for example, sodium silicate, potassium silicate, silicates of the quaternary ammoniums and silicates of the amines. In addition, aluminates, stannates, zincates and plumbates of alkali metals or organic bases may also be used. These alkali metal hydroxides, organic bases, silicates and metal acid salts may be used as a mixture thereof.

When the alkali metal atom of the alkali metal hydroxide or the molecule of the organic base is represented by "M", the amount of the alkali metal hydroxide or the organic base or the water-soluble silicate of the alkali metal hydroxide or organic base to be added is from 20 to 200 moles, preferably from 60 to 100 moles, of $SiO_2$ to one mole of $M_2O$ where $SiO_2$ is the total silica content derived from the active silicic acid used in step (a) and the silica content of the above-mentioned silicate. After the addition, the resulting liquid comes to have a pH value of from 7 to 10 or so.

In step (c), the mixture obtained in the above-mentioned step (b) is heated. The heating is effected at a temperature of 60° to 250° C. Specifically, when the active silicic acid-containing aqueous colloidal liquid to be used in step (a) has a pH value of from 2 to 4, the heating temperature is suitably within the range of from 60° to 150° C.; and when the active silicic acid-containing aqueous colloidal liquid to be used in step (a) has a pH value higher than 4 and up to 5, the heating temperature may be higher and is allowed to be up to 250° C. The heating time is required to be from 0.5 to 40 hours or so. The heating is preferably conducted with stirring the above-mentioned mixture and possibly without evaporating water.

After being thus heated in step (c), elongated-shaped colloidal silica particles, which are elongated in only one plane with an almost uniform thickness along the elongation of from 5 to 20 m$\mu$ and which have a particle size of from 40 to 300 m$\mu$ as measured by dynamic light-scattering method, are formed in the liquid. Accordingly, although the liquid obtained is a sol, it has an $SiO_2$ concentration of generally from 1 to 6% by weight or so and contains a large amount of anions. The sol is generally further concentrated. However, it is preferable to remove from the sol obtained in step (c) any excess amount of the anions which would interfere with the stabilization or purification of the sol when concentrated to an $SiO_2$ concentration of from 10 to 30% by weight. In removing the anions, it is preferred that a part of water in the sol is also removed together with the anions. After a part of water is thus removed from the sol, the $SiO_2$ concentration in the sol is elevated. Accordingly, the amount of the water to be removed by the step is preferably so adjusted as to be able to give a sol having an $SiO_2$ concentration of 30% by weight or less. For removing both water and anions from the sol obtained in step (c), a method of using a conventional microporous membrane, for example, an ultrafiltrating membrane, for removing them is preferred. Alternatively, for removing the anions, there is also mentioned an ionic exchange method using an ion-exchanging resin. After the amount of the anions which would interfere with the above-mentioned stabilization has been removed, the sol may be also be concentrated by evaporation. An alkali may optionally be added to the sol obtained in step (c) or the concentrated sol so as to adjust the pH value of the sol.

The above-mentioned sol, from which anions and water have been removed, has an $SiO_2$ concentration of from 10 to 30% by weight, a viscosity of from several cp to 500 cp or so at room temperature and a pH value of from 8.5 to 11. Although the sol still contains anions in an amount of 1000 ppm or less, generally from 200 to 800 ppm or so, it is extremely stable. The sol contains alkali metal ions and/or organic bases in an amount of molar ratio of $SiO_2/M_2O$ (where M has the same meaning as defined above) from 20 to 200 and additionally contains calcium or magnesium and optionally the above-mentioned polyvalent metals in an amount of from 1500 to 15000 ppm or so of their oxides to $SiO_2$. The colloidal silica particles in the sol may still have the shape and the size of those already formed by the above-mentioned step (c) and they contain CaO or MaO and optionally polyvalent metal oxides as existing in the sol. Chemical analysis of the sol can easily be effected by a conventional method. The particle size of the colloidal silica particles may be easily measured by the dynamic light-scattering method, BET method and electromicroscopic method with a commercial apparatus.

The sol obtained by the method of the present invention as mentioned above is finally and irreversibly converted into a gel by removal of water therefrom. Although the sol is an alkaline aqueous sol, it may be converted into an acidic aqueous silica sol by cationic exchange treatment thereof. When a different alkali is added to the resulting acidic sol, another alkaline aqueous silica sol which is different from the above-mentioned alkaline aqueous sol can be obtained. The acidic aqueous silica sol is preferred to have a pH value of from 2 to 4. From the acidic aqueous silica sol can be obtained an aqueous sol comprising positively charged colloidal silica particles by a conventional method. Further, an organosol can be obtained from the said aqueous sol, by substituting for the water of the medium thereof an organic solvent by a conventional method, for example, a distillation substitution method. All of said acidic aqueous silica sol, positively charged aqueous silica sol and organo silica sol, still have the shape of those already formed in step (c), and these sols are finally and irreversibly converted into gels by removal of the medium therefrom.

Each of the alkaline aqueous silica sol, acidic aqueous silica sol and positively charged silica sol as prepared in accordance with the present invention can be mixed with any other conventional sol(s) thereby to obtain a stabilized sol. Regarding the organosol of the present invention, it may also be mixed with any other conventional sol(s) to obtain a stabilized sol, provided that the solvents in the sols to be mixed are compatible with each other so as not to cause coagulation of the colloidal silica in the mixed sol.

The sol of the present invention can also be obtained by a different method. In accordance with this second method, colloidal silica particles having a thickness of from 5 to 40 m$\mu$ and a particle size of from 40 to 500 m$\mu$ as measured by dynamic light-scattering method are formed. The second method comprises the above-mentioned steps (a'), (b') and (c'), which is advantageous for preparation of particles having a larger thickness.

The acidic aqueous silica sol to be used in step (a'), which has an average particle diameter of from 3 to 30 m$\mu$, an $SiO_2$ content of from 0.5 to 25% by weight and a pH value of from 1 to 5, may be any acidic aqueous silica sol which is prepared by any conventional method, for example, by the methods described in U.S. Pat. Nos. 2,680,721 and 2,900,348. The shape of the colloidal silica particles in the sol may be either spherical or non-spherical, provided that the ratio $D_1/D_2$ of the particle size ($D_1$) measured by dynamic light-scattering method to the particle size ($D_2$) as calculated from the specific surface area measured by BET method is less than 5. However, in order that the particles to be formed may have a uniform thickness along the elongation thereof, a sol should preferably be used which contains spherical colloidal silica particles.

The same operations as those for the above-mentioned steps (a), (b) and (c) may be applied to steps (a'), (b') and (c') of the second method. However, in step (a'), the amount of CaO or MgO or both of them to be added may be elevated up to 1.00% by weight of the $SiO_2$ of the colloidal silica; in step (b'), the amount of the alkali metal hydroxide or water-soluble organic base or water-soluble silicate thereof may be reduced to 300 as the molar ratio of $SiO_2/M_2O$; and in step (c'), the heating temperature may be elevated up to 300° C.

The sol obtained via steps (a'), (b') and (c') can be concentrated in the same manner as mentioned above to give a stable alkaline aqueous silica sol having an anion concentration of 0.1% by weight or less and an $SiO_2$ concentration of from 1 to 40% by weight. In addition, an acidic sol, a positively charged silica sol, an organosol and a mixed sol may also be prepared from the said sol by the same processes as mentioned above.

The characteristic shape of the colloidal silica particles in the sol of the present invention, which has elongation in only one plane and a uniform thickness of from 5 to 40 m$\mu$ along the elongation with a degree of elongation of from 5 to 30 in terms of the ratio of $D_1/D_2$ and has a particle size $D_1$ of from 40 to 500 m$\mu$ as measured by dynamic light-scattering method, is caused by the particular methods of the present invention as explained in detail in the above. Although it is difficult to completely clarify the mechanism of forming the colloidal silica particles, the following could be presumed.

First, in step (a), when an aqueous calcium or magnesium salt or a mixture of aqueous calcium and magnesium salt is added to the active silicic acid colloid-containing aqueous liquid, the calcium ions and/or the magnesium ions are captured by the active silicic acid particles. Next, in step (b), when an alkali metal hydroxide or an organic base or a silicate of the alkali metal hydroxide or organic base is added to the resulting aqueous solution formed in step (a), a part of the active silicic acid particles, which have captured the calcium ions and/or magnesium ions therewith, would be chain-like coagulated in typing in a row thereby forming string-like elongated particles which might be angled in any direction. In the string-like coagulated particles, the elongation may not be in only one plane or there may partially be a three-dimensional network structure. Next, after being heated in step (c), the active silicic acid particles are polymerized and the above-mentioned long string-like coagulated particles are cleaved, whereupon the three-dimensional structure would be broken into fragments of a certain length, probably from 10 to 100 m$\mu$ or so, and the already captured calcium ions and/or magnesium ions would thereby react on the thus broken fragments and also on the coagulated particles having a short length so that the elongation of fragments and the short string-like coagulated particles would be settled so as to exist only in one plane. The continuous heating in step (c) causes precipitation of the silicic acid dissolved in the liquid or the silicic acid dissolved from the easily soluble parts of the broken fragments onto the surface of the said fragments one by one, whereby the thickness of the fragments may be enlarged. As a result of the sequence of the process, colloidal silica particles which have an almost uniform thickness of from 5 to 20 mµ along the elongation and have been extended in only one plane with a length of from 15 to 200 mµ or so are formed in the colloidal liquid.

Also in the above-mentioned second method comprising steps (a'), (b') and (c'), it is believed that the colloidal silica particles having a particle size of from 3 to 30 mµ would function in the same manner as mentioned above, in place of the fine particles of the active silicic acid.

When the alkali metal hydroxide or organic base or water-soluble silicate of the alkali metal hydroxide or organic base to be used in step (b) is first added to the active silicic acid-containing aqueous colloid liquid to be used in step (a) and then an aqueous solution of the calcium salt or magnesium salt or a mixture of the calcium salt and magnesium salt to be used in step (a) is thereafter added to the resulting mixture, rapid gelation occurs so that the resulting mixture can hardly be dispersed by a conventional stirring means. Further, even if the thus formed gel is heated, the colloidal silica particles having the above-mentioned shape of the present invention can no longer be obtained.

In step (a), when the $SiO_2$ concentration of the active silicic acid-containing aqueous colloidal liquid to be used is less than 1% by weight, removal of a large amount of water is required in concentration of the sol formed, which is inefficient. On the other hand, when the $SiO_2$ concentration of the active silicic acid-containing aqueous colloid liquid is more than 6% by weight, the liquid lacks its extreme stability so that a sol having a determined quality can hardly be produced. Accordingly, the $SiO_2$ concentration is preferably within the range of from 1 to 6% by weight. Among the active silicic acid-containing aqueous colloidal liquids having such $SiO_2$ concentration, those having a pH value of from 2 to 5 are further preferred. When the pH value is higher than 5, the stability of the active silicic acid-containing aqueous liquid is insufficient, and the colloidal silica particles in the sol obtained by step (c) can not have the above-mentioned elongated shape. The pH value may be lower than 2, if desired, but such lower pH value is unfavorable since not only addition of any acids is required but also the amount of the unnecessary anions increases in the products.

In step (a), when a calcium salt or magnesium salt or a mixture of calcium salt and magnesium salt is added to the active silicic acid-containing aqueous colloidal liquid in the form of an aqueous solution of the salt, uniform mixing of the resulting mixture may easily be attained. The uniform mixing is important for facilitating the uniform capture of the added calcium ion and/or magnesium ion by the silicic acid.

Of the active silicic acid-containing aqueous colloidal liquids to be used in step (a), one obtainable by cationic exchange treatment of an aqueous solution of a water-soluble silicate contains almost no dissolved or free cation in the liquid. Of the water-soluble silicate to be used, an inexpensive and easily available water glass is preferred. A water-soluble silicate obtainable by dissolving a silica obtained by hydrolysis of a silicon halide or alkoxysilane in an alkali has a low content of impurities, especially polyvalent metals, but it is expensive. As opposed to this, a water glass as a general industrial product contains polyvalent metals generally in an amount of several thousands ppm or less as the oxides thereof to the silica content therein. When an aqueous solution of such water glass is subjected to cationic exchange treatment, all the said polyvalent metal content can not be removed. Accordingly, the resulting active silicic acid-containing aqueous colloidal liquid generally contains the remaining polyvalent metal oxides in an amount of about 5000 ppm or less. But since the oxides are captured by the active silicic acid in the liquid or by the fine polymer particles through chemical bond with silica or adsorption thereto, the liquid contains neither dissolved cations nor free cations therein. The remaining polyvalent metal components are reckoned in the polyvalent metal components to be used together with the calcium salt and/or magnesium salt in step (a) as a part thereof, and therefore these act in the same manner as the polyvalent metal salts to be used together with the calcium salt and/or magnesium salt in step (a).

When the amount of the calcium salt or magnesium salt or a mixture of calcium salt and magnesium salt to be added in step (a) is less than 1500 ppm by weight as CaO or MgO or both of them to $SiO_2$ of the active silicic acid, the shape of the finally obtainable colloidal silica particles is spherical or cocoonlike. On the other hand, when it is more than 8500 ppm, the colloidal silica particles having the particular shape of the invention can not be formed by step (c). Accordingly, it is believed that the CaO, MgO or both of them in amount of from 1500 to 8500 ppm substantially effects the formation of the particles of the present invention. Some of the above-mentioned polyvalent metal components to be used together with the calcium salt and/or magnesium salt have a function of accelerating the formation of the colloidal silica particles or some others of them have a function of retarding the formation of the particles. When the amount of such additional polyvalent metal components to be used is more than about 80% by weight of the oxides thereof to CaO and/or MgO, the active silicic acid-containing aqueous colloidal liquid will thereby be gelled.

After addition and mixing of the calcium salt and/or magnesium salt and optionally other metal salts in the above-mentioned step (a), the alkali metal hydroxide or organic base or silicate of the alkali metal hydroxide or organic base is immediately added to the resulting liquid as soon as possible in step (b) so that the active silicic acid particles in the liquid may not vary unfavorably. The addition of such alkaline substances is also effected directly or as an aqueous solution of the substance having a concentration of from 5 to 30% or so by weight, preferably with stirring, so as to facilitate the uniform mixing of the resulting liquid.

In step (b), when the amount of the alkaline substances to be added is less than 20 as a molar ratio of the said $SiO_2/M_2O$, the particles can not grow by heating in the subsequent step (c). On the contrary, when the molar ratio is more than 200, the particles can not also grow by heating in step (c) but the sol will be gelled by such heating. Accordingly, addition of the said alkaline substances in an amount of from 20 to 200, preferably from 60 to 100, as the molar ratio of $SiO_2/M_2O$, followed by heating of the resulting mixture in the subsequent step (c) gives the intended colloidal silica particles having the size and the shape as specifically defined in the present invention. Addition of the alkaline substances in step (b) is desired to be effected at a possibly lower temperature, preferably at room temperature, so that the stirring of the resulting mixture may easily be conducted.

When the heating temperature in step (c) is lower than 60° C., the intended colloidal silica particles of the present invention cannot be formed, and therefore it is required to be 60° C. or higher. However, when the active silicic acid-containing aqueous colloidal liquid to be used in step (a) has a pH of from 2 to 4, a higher heating temperature exceeding 150° C. will cause formation of gels. On the other hand, when the active silicic acid-containing aqueous colloidal liquid to be used in step (a) is more than 4 and up to 5 in pH, the heating temperature in step (c) may be higher than 150° C. However, a temperature higher than 250° C. will also cause gelation. The heating time may be shorter for a higher temperature than 60° C. for forming particles of a determined size. As opposed to this, when the heating temperature is lower, a longer heating time will be required. Accordingly, in step (c), the heating is preferably effected at 60° to 250° C. for 0.5 to 40 hours. After completion of step (c), the sol obtained is cooled. The sol may optionally be diluted with water, if desired.

Stability is an indispensable property for the sol as an industrial product, and the sol is generally desired to have an $SiO_2$ concentration of from 10 to 30% by weight. In order to obtain a stable alkaline sol having the $SiO_2$ concentration to fall within the said range, the concentration of anions which may exist in the sol is generally 1000 ppm or less. As calcium, magnesium and other polyvalent metal ions are captured in the colloidal silica particles in the sol of the present invention, no metal ions exist in the aqueous medium of the sol in such an amount that would interfere with the stability of the sol. In order to obtain the stable alkaline aqueous sol having the $SiO_2$ concentration of from 10 to 30% by weight, alkaline cations are required to be contained in the sol in an amount of from 20 to 200 or so as a molar ratio of $SiO_2/M_2O$ (where M has the same meaning as mentioned above). Because of the existence of such alkaline cations, the sol generally has a pH value of from 8.5 to 11. When a microporous membrane is used for removal of the anions from the sol after step (c), the co-existing cations will also be removed together with the anions so that the alkaline cations to remain in the sol will often be lacking. In such case, the above-mentioned alkali metal hydroxide or organic base may be added to the sol in an amount necessary for stabilizing the same during or after the concentration, whereby a stable sol can be obtained. In accordance with a method of using a microporous membrane, such as an ultrafiltration membrane, the colloidal silica particles in the sol do not pass through the membrane so that the sol can be concentrated simultaneously with removal of both the anions and water therefrom. The thus concentrated sol may optionally be diluted with water, if desired.

In accordance with the second method of the present invention, when the $SiO_2$ concentration in the acidic sol to be used in step (a') is less than 0.5% by weight, a large amount of water is required to be removed from the sol in the concentration step after step (c') and such is inefficient. When, on the other hand, the $SiO_2$ concentration is higher than 25% by weight, the amount of the calcium salt or magnesium salt to be added to the sol will be large, and the sol to which such a large amount of the salt has been added is unfavorable as it easily gels. When the acidic sol to be used in step (a') has a pH value overstepping the range of from 1 to 5, the stability of the sol will be poor and the colloidal silica particles in the sol obtained by step (c') can not have the above-mentioned elongated shape. In addition, when the particle size of the acidic sol to be used in step (a') is more than 30 m$\mu$, the colloidal silica particles in the sol obtained by step (c') can not also have the elongated shape. Although employable, an acidic silica sol having a particle size less than 3 m$\mu$ is not generally used in step (a'), since such is far better to be processed in the first step of the present invention comprising the steps (a), (b) and (c). The amount of the calcium salt or magnesium salt to be added to step (a') may be larger than that to be added to step (a). However, when the said amount is more than 1.00% by weight to the $SiO_2$ content, the intended colloidal silica particles having the aforesaid elongated shape of the present invention can not also be obtained by step (c'). The amount of the alkaline substances to be added in step (b') may be smaller than that to be added in the step (b). However, when the said amount is more than 300 as the molar ratio of $SiO_2/M_2O$, the sol will also be gelled in step (c'). The heating temperature in step (c') may be fairly higher than that in the step (c). However, when the temperature is higher than 300° C., the sol will also be gelled during the heating. In addition, the efficiency of the process can not be so elevated even under such elevated heating temperature. Regarding the heating time in step (c'), it may be shorter when the heating temperature is higher for forming particles with a determined diameter. For instance, when the heating temperature is 60° to 300° C., the heating time may be 0.5 to 40 hours so as to efficiently form the intended colloidal silica particles having the above-mentioned particular elongated shape.

When the silica sol prepared by the second method of the present invention comprising the steps (a'), (b') and (c') has a high $SiO_2$ concentration and also has a high anion content of 1000 ppm or more, the stability of the sol will also lower. In the alkaline aqueous sol, presence of alkaline cations in an amount of from 20 to 300 as the molar ratio of $SiO_2/M_2O$ is required for stabilization thereof. In particular, when the silica sol is concentrated, the anion content and the cation content in the sol are important to be kept within the above-mentioned ranges which are necessary for stabilizing the concentrated sol. Concentration of the sol may be effected in the same manner as that to be effected after steps (a), (b) and (c), provided that the stability of the sol may be maintained as mentioned above.

The following examples are intended to illustrate the present invention in more detail but not to limit it in any way.

EXAMPLE 1

Water was added to a commercial JIS No. 3 sodium water glass (molar ratio of $SiO_2/Na_2$: 3.22, $SiO_2$ content: 28.5% by weight) to prepare an aqueous sodium silicate solution having an $SiO_2$ concentration of 3.6% by weight. The aqueous sodium silicate solution was passed through a column filled with a cationic exchange resin (trade name of Amberlite 120B), to obtain an active silicic acid-containing aqueous colloid liquid having an $SiO_2$ concentration of 3.56% by weight, a pH value of 2.81 and an electroconductivity of 731 $\mu$S/cm. The liquid contained $Al_2O_3$ and $Fe_2O_3$ as remained therein in a total amount of 75 ppm.

2000 g of the active silicic acid-containing aqueous colloidal liquid was put in a glass container and then 8.0 g of aqueous 10 wt. % calcium chloride solution was added thereto with stirring at room temperature. After 30 minutes, 12.0 g of aqueous 10 wt. % sodium hydroxide solution was added thereto with stirring at room temperature. The thus obtained mixture had a pH value of 7.6 and a molar ratio of $SiO_2/Na_2O$ of 80.

Next, the mixture was fed into a stainless steel autoclave and heated for 6 hours with stirring at 130° C. and then cooled, and the content was taken out therefrom. The thus formed liquid was a silica sol, which contained $SiO_2$ in an amount of 3.52% by weight and had a molar ratio of $SiO_2/Na_2O$ (by titrimetric method) of 101 and a pH value of 9.64. In the sol, the CaO content by weight to $SiO_2$ was 5400 ppm, and no free calcium ion was detected therein.

Next, the silica sol was concentrated in an ultrafiltration apparatus to give a concentrated silica sol having an $SiO_2$ concentration of 21% by weight. As a result of analysis, the concentrated sol was found not to contain any dissolved or free calcium ion, and it had a specific gravity of 1.136, a pH value of 9.24, a viscosity of 125 cp (at 20° C.), a molar ratio (by titrimetric method) of $SiO_2/Na_2O$ of 126, a CaO content of 0.113% by weight, a chloride ion content of 0.019% by weight, a sulfate ion content of 0.0020% by weight and an electroconductivity of 2080 $\mu S/cm$. From the electromicroscopic photograph, the colloidal silica particles in the sol were found to be elongated particles having a thickness of 12 $m\mu$. The particle size of the colloidal silica particles in the sol was 84.6 $m\mu$, as measured by dynamic light-scattering method. The colloidal silica particle size was calculated to be 12 $m\mu$ by BET method. FIG. 1 shows a 200,000 magnification photograph of the colloidal silica particles of the sol, as taken with an electronic microscope.

The concentrated sol was stored in a closed vessel at 60° C., resulting in no deterioration even after one month.

The sol was coated on a glass plate and dried, which formed a better film than that formed from a conventional sol. When brought into contact with water, the film did not dissolve in water.

EXAMPLE 2

2000 g of the active silicic acid-containing aqueous colloidal liquid ($SiO_2$: 3.56%, pH: 2.81) as prepared in Example 1 was put in a glass container, and 8.0 g of aqueous 10 wt. % calcium chloride solution was added thereto with stirring. Next, 12.0 g of aqueous 10 wt. % sodium hydroxide solution was further added thereto also with stirring, to give a mixture having a molar ratio of $SiO_2/Na_2O$ of 80 and a pH value of 7.62.

The mixture was fed into a 2.5 liter stainless steel autoclave and heated at 130° C. for 24 hours. The thus obtained silica sol contained $SiO_2$ in an amount of 3.52% by weight and had a molar ratio of $SiO_2/Na_2O$ (as measured by titrimeteric method) of 101. It contained CaO in an amount of 5400 ppm by weight to $SiO_2$. It had a pH value of 9.81.

The sol was concentrated in an ultrafiltration apparatus to a silica concentration of 15.2% by weight. The resulting sol had a specific gravity of 1.092, a pH value of 9.36, a viscosity of 225 cp, a molar ratio of $SiO_2/Na_2O$ (by titrimetric method) of 185, a CaO content of 820 ppm, a Cl content of 223 ppm, an $SO_4$ content of 24 ppm, an electroconductivity of 1620 $\mu S/cm$, a particle size (by BET method) of 14.5 $m\mu$ and a particle size (by dynamic light-scattering method) of 167 $m\mu$. The sol was stable for one month at 60° C.

EXAMPLE 3

2000 g of the active silicic acid-containing aqueous colloidal liquid ($SiO_2$: 3.56%, pH: 2.81) obtained in Example 1 was put in a glass container, and 8.0 g of aqueous 10 wt. % calcium chloride solution was added thereto with stirring. Next, 13.5 g of aqueous 10 wt. % sodium hydroxide solution was added thereto also with stirring, to give a mixture having a molar ratio of $SiO_2/Na_2O$ of 70 and a pH value of 7.84.

The mixture was fed into a 2.5 liter stainless steel autoclave and heated at 100° C. for 6 hours. The thus formed silica sol contained $SiO_2$ in an amount of 3.52% by weight and had a molar ratio of $SiO_2/Na_2O$ (measured by titrimetric method) of 88.0. It contained CaO in an amount of 5400 ppm to $SiO_2$. It had a pH value of 9.55.

The sol was concentrated in an ultrafiltration apparatus to the silica concentration of 20.6% by weight. The resulting sol had a specific gravity of 1.133, a pH value of 9.21, a viscosity of 45 cp, a molar ratio of $SiO_2/Na_2O$ (measured by titrimetric method) of 100, a CaO content of 1110 ppm, a Cl content of 265 ppm, an $SO_4$ content of 35 ppm, an electroconductivity of 2970 $\mu S/cm$, a particle size (by BET method) of 8.8 $m\mu$ and a particle size (by dynamic light-scattering method) of 51.8 $m\mu$. The sol was stable for one month at 60° C.

EXAMPLE 4

The aqueous solution of a commercial sodium water glass as used in Example 1 was subjected to cationic exchange treatment to obtain an active silicic acid-containing aqueous colloidal liquid having an $SiO_2$ content of 3.66% by weight and a pH value of 2.82. 2000 g of the active silicic acid-containing aqueous colloidal liquid was put in a glass container, and 1.08 g of HCl-acidic aqueous 9.52 wt. % zinc chloride solution was added thereto with stirring. Next, 12.0 g of aqueous 10 wt. % calcium nitrate was added thereto also with stirring and then 13.7 g of aqueous 10 wt. % sodium hydroxide solution was added with stirring, to give a mixture having a molar ratio of $SiO_2/Na_2O$ of 70 and a pH value of 7.82.

The mixture was fed into a 2.5 liter stainless steel autoclave and heated at 130° C. for 6 hours. The resulting silica sol contained $SiO_2$ in an amount of 3.61% by weight and had a molar ratio of $SiO_2/Na_2O$ (by titrimetric method) of 88.0. It contained CaO of 5600 ppm by weight and ZnO of 890 ppm by weight to $SiO_2$. It had a pH value of 9.72.

The sol was concentrated in an ultrafiltration apparatus to the silica concentration of 21.8% by weight. The resulting sol had a specific gravity of 1.142, a pH value of 9.37, a viscosity of 79 cp, a molar ratio of $SiO_2/Na_2O$ (by titrimetric method) of 123, a CaO content of 1220 ppm, a ZnO content of 195 ppm, a Cl content of 30 ppm, an $NO_3$ content of 345 ppm, an $SO_4$ content of 24 ppm, an electroconductivity of 2400 $\mu S/cm$, a particle size (by BET method) of 11.0 $m\mu$ and a particle size (by dynamic light-scattering method) of 62.6 $m\mu$. The sol was stable for one month at 60° C.

EXAMPLE 5

The aqueous solution of a commercial sodium water glass as used in Example 1 was subjected to cationic exchange treatment to obtain an active silicic acid-containing aqueous colloidal liquid having an $SiO_2$ content of 3.74% by weight and a pH value of 2.85. 2000 g of the active silicic acid-containing aqueous colloidal liquid was put in a glass container and 7.6 g of aqueous 10 wt. % magnesium chloride solution was added thereto with stirring. Next, 17.5 g of aqueous 10 wt. % potassium hydroxide solution was added thereto also with stirring, to give a mixture having a molar ratio of $SiO_2/K_2O$ of 80 and a pH value of 7.39.

The mixture was fed into a 2.5 liter stainless steel autoclave and heated at 120° C. for 6 hours. The resulting silica sol had an $SiO_2$ content of 3.69% by weight and a molar ratio of $SiO_2/K_2O$ (by titrimetric method) of 101. It contained MgO in an amount of 4390 ppm by weight to $SiO_2$. It had a pH value of 8.47.

To 1564 g of the sol was added 4.5 g of aqueous 10 wt. % potassium hydroxide solution with stirring, whereby the sol had a pH value of 9.53.

The sol was then concentrated in an ultrafiltration apparatus to a silica concentration of 16.2% by weight. The resulting sol had a specific gravity of 1.100, a pH value of 9.20, a viscosity of 69 cp, a molar ratio of $SiO_2/K_2O$ (by titrimetric method) of 143, an MgO content of 710 ppm, a Cl content of 301 ppm, an $SO_4$ content of 59 ppm, an electroconductivity of 3070 μS/cm, a particle size (by BET method) of 11.1 mμ and a particle size (by dynamic light-scattering method) of 85.5 mμ. The sol was stable for one month at 60° C.

EXAMPLE 6

2000 g of the active silicic acid-containing aqueous colloidal liquid ($SiO_2$: 3.74 wt. %, pH: 2.85) obtained in Example 5 was put in a glass container and 4.8 g of aqueous 10 wt. % magnesium chloride solution was added thereto with stirring. Next, 2.44 g of monoethanolamine was added thereto also with stirring, to give a mixture having a molar ratio of $SiO_2$/monoethanolamine of 31 and a pH value of 7.62.

The mixture was fed into a 2.5 liter stainless steel autoclave and heated at 130° C. for 6 hours. The resulting silica sol had an $SiO_2$ content of 3.73% by weight, a monoethanolamine content of 0.122% by weight and a molar ratio of $SiO_2$/monoethanolamine (by titrimetric method) of 36.5. It contained MgO in an amount of 2820 ppm by weight to $SiO_2$ and had a pH value of 9.00.

To 1917 g of the sol was added 1.0 g of monoethanolamine with stirring, whereby the sol had a pH value of 9.50.

The sol was then concentrated in an ultrafiltration apparatus to a silica concentration of 14.8% by weight. The resulting sol had a specific gravity of 1.091, a pH value of 9.19, a viscosity of 33 cp, a monoethanolamine content of 0.362% by weight, a molar ratio of $SiO_2$/monoethanolamine (by titrimetric method) of 47, an MgO content of 417 ppm, an electroconductivity of 1670 μS/cm, a particle size (by BET method) of 10.6 mμ and a particle size (by dynamic light-scattering method) of 72.5 mμ. It was stable for 6 months or more at room temperature.

EXAMPLE 7

A commercial JIS No. 3 sodium water glass ($SiO_2$ content: 29.2 wt. %, $Na_2O$ content: 9.47 wt. %, molar ratio of $SiO_2/Na_2O$: 3.18) was diluted with water to a silica concentration of 2.90% by weight, and this was passed through a column filled with a cationic exchange resin to give an active silicic acid-containing aqueous colloidal liquid having an $SiO_2$ concentration of 2.90% by weight and a pH value of 2.85. The total of the remaining $Al_2O_3$ and $Fe_2O$ was 26 ppm. 2000 g of the thus prepared liquid was put in a glass container, and 9.0 g of aqueous 10 wt. % calcium nitrate solution was added thereto with stirring. Next, 9.66 g of aqueous 10 wt. % sodium hydroxide solution was added thereto also with stirring, to give a mixture having a molar ratio of $SiO_2/Na_2O$ of 80 and a pH value of 7.56. The mixture was fed into a 2.5 liter stainless steel autoclave and heated at 130° C. for 6 hours. The resulting silica sol had an $SiO_2$ content of 2.87% by weight and a molar ratio of $SiO_2/Na_2O$ (by titrimetric method) of 113. It contained CaO in an amount of 5300 ppm by weight to $SiO_2$ and had a pH value of 9.67.

The sol was concentrated in an ultrafiltration apparatus to an $SiO_2$ concentration of 16.0% by weight. The resulting sol had a specific gravity of 1.098, a pH value of 9.32, a viscosity of 70 cp, an $SiO_2$ content of 16.0% by weight, a molar ratio of $SiO_2/Na_2O$ (by titrimetric method) of 108, a CaO content of 850 ppm, a Cl content of 30 ppm, an $NO_3$ content of 313 ppm, an $SO_4$ content of 22 ppm, an electroconductivity of 1745 μS/cm, a particle size (by BET method) of 10.9 mμ and a particle size (by dynamic light-scattering method) of 69.3 mμ. The sol was stable at 60° C. for one month.

EXAMPLE 8

The silica sol having a silica concentration of 21.0% by weight, as obtained in Example 1, was diluted with pure water to a silica concentration of 16% by weight. This was passed through a column filled with a cationic exchange resin to obtain an acidic silica sol having a silica concentration of 15.7% by weight.

The resulting sol had a specific gravity of 1.092, a pH value of 2.20, a viscosity of 13 cp, an $SiO_2$ content of 15.7% by weight, an $Na_2O$ content of 190 ppm, a CaO content of 185 ppm, a Cl content of 144 ppm, an $SO_4$ content of 16 ppm, an electroconductivity of 3030 μS/cm, a particle size (by BET method) of 12.0 mμ and a particle size (by dynamic light-scattering method) of 84.6 mμ. The sol was stable at room temperature for 3 months or more.

EXAMPLE 9

800 g of the acidic silica sol obtained in Example 8 was put in a rotary vacuum condenser, which was conditioned to have a vacuum degree of from 650 to 720 Torr and a liquid temperature of from 20° to 40° C. 12,020 g of absolute methanol was added thereto over 14 hours while water formed was removed from the reaction system by azeotropic distillation, whereby the water content in the sol was substituted by methanol.

The thus obtained methanol silica sol had a specific gravity of 0.876, a viscosity of 14.5 cp, an $SiO_2$ content of 14.3% by weight and an $H_2O$ content of 1.0% by weight. The sol was stable at room temperature for 3 months or more.

COMPARATIVE EXAMPLE 1

2000 g of the active silicic acid-containing aqueous colloidal liquid ($SiO_2$: 3.56% by weight, pH: 2.81) obtained in Example 1 was put in a glass container, and 12.0 g of aqueous 10 wt. % sodium hydroxide solution was added thereto with stirring. The resulting mixture had a molar ratio of $SiO_2/Na_2O$ of 80 and a pH value of 7.8.

Figure 2:
FIG. 2 is a 200,000 magnification-transmission electro-microscopic photograph showing the particle structure of the colloidal silica of the concentrated sol obtained in Comparative Example 1.

The mixture was fed into a 2.5 liter stainless steel autoclave and heated at 130° C. for 6 hours. The resulting sol had an $SiO_2$ content of 3.54% by weight, a molar ratio of $SiO_2/Na_2O$ (by titrimetric method) of 107 and a ph value of 10.07. The sol was concentrated in an ultrafiltration apparatus to an $SiO_2$ concentration of 21.9% by weight. The resulting sol had a specific gravity of 1.144, a pH value of 9.69, a viscosity of 4.3 cp, an $SiO_2$ content of 21.9% by weight, a molar ratio of $SiO_2/Na_2O$ (by titrimetric method) of 126, an electroconductivity of 2140 μS/cm, a particle size (by BET method) of 11.0 mμ and a particle size (by dynamic light-scattering method) of 26.8 mμ. FIG. 2 shows a photograph of the sol taken with an electron microscope, which indicates that the shape of the colloidal silica particles in the sol is spherical.

COMPARATIVE EXAMPLE 2

Water was added to the sodium water glass as mentioned in Example 1 so that the water glass was diluted to a concentration of 5.0% by weight. 1500 g of the resulting aqueous solution was put in a glass container and 380 g of aqueous 10 wt. % sulfuric acid solution was added thereto with stirring, whereby the pH value of the resulting mixture became 4.54.

The wet gel of the thus formed silica was taken out by filtration, and 4000 g of pure water was poured thereto and washed. The resulting wet gel was dispersed in pure water to obtain 1800 g of a dispersion having an $SiO_2$ concentration of 4.0% by weight. To this was added 12.0 g of aqueous 10 wt. % sodium hydroxide solution. The resulting mixture had a molar ratio of $SiO_2/Na_2O$ of 80 and a pH value of 9.0.

The thus formed dispersion was fed into a 2.5 liter stainless steel autoclave and heated at 130° C. for 6 hours. The resulting sol had an $SiO_2$ content of 3.97% by weight, a molar ratio of $SiO_2/Na_2O$ (by titrimetric method) of 87 and a pH value of 10.46.

Figure 3:
FIG. 3 is a 200,000 magnification-transmission electro-microscopic photograph showing the particle structure of the colloidal silica of the concentrated sol obtained in Comparative Example 2.

The sol was concentrated in an ultrafiltration apparatus to the silica concentration of 21.2% by weight. The resulting sol had a specific gravity of 1.138, a pH value of 9.98, a viscosity of 40 cp, an $SiO_2$ content of 21.2% by weight, a molar ratio of $SiO_2/Na_2O$ (by titrimetric method) of 98, an electroconductivity of 2520 μS/cm, a particle size (by BET method) of 9.9 mμ and a particle size (by dynamic lightscattering method) of 91.2 mμ. FIG. 3 shows a photograph of the sol taken with an electronic microscope, which indicates that the colloidal silica particles in the sol are non-spherical but do not have an elongated shape.

COMPARATIVE EXAMPLE 3

2000 g of the active silicic acid-containing aqueous colloidal liquid ($SiO_2$: 3.56% by weight, pH: 2.81) obtained in Example 1 was put in a glass container, and 8.0 g of aqueous 10 wt. % calcium chloride solution was added thereto with stirring. Next, 12.0 g of aqueous 10 wt. % sodium hydroxide solution was added thereto also with stirring, to give a mixture having a molar ratio of $SiO_2/Na_2O$ of 80. It had a pH value of 7.62 and had a CaO content of 5400 ppm by weight to $SiO_2$.

The mixture was fed into a 2.5 liter stainless steel autoclave and then heated at 160° C. for 6 hours. As a result, a gel substance was formed in the container, which was no more fluid.

COMPARATIVE EXAMPLE 4

2000 g of the active silicic acid-containing aqueous colloidal liquid ($SiO_2$: 3.56% by weight, pH: 2.81) obtained in Example 1 was put in a glass container, and 8.0 g of aqueous 10 wt. % calcium chloride solution was added thereto with stirring. Next, 3.8 g of aqueous 10 wt. % sodium hydroxide solution was added thereto also with stirring, to give a mixture having a molar ratio of $SiO_2/Na_2O$ of 250. It had a pH value of 6.54 and had a CaO content of 5400 ppm by weight to $SiO_2$.

The mixture was fed into a 2.5 liter stainless steel autoclave and then heated at 130° C. for 6 hours. As a result, a gel substance was formed in the container, which was no more fluid.

COMPARATIVE EXAMPLE 5

2000 g of the active silicic acid-containing aqueous colloidal liquid ($SiO_2$: 3.56% by weight, pH: 2.81) obtained in Example 1 was put in a glass container, and 16.0 g of aqueous 10 wt. % calcium chloride solution was added thereto with stirring. Next, 12.0 g of aqueous 10 wt. % sodium hydroxide solution was added thereto also with stirring, to give a mixture having a molar ratio of $SiO_2/Na_2O$ of 80 and a pH value of 7.48. It contained CaO in an amount of 10800 ppm by weight to $SiO_2$.

In preparation of the mixture, the viscosity of the mixture began to increase in 20 minutes after the initiation of the addition of the aqueous sodium hydroxide solution, and the fluidity of the mixture thus lowered. The pasty substance having a lowered fluidity was fed into a 2.5 liter stainless steel autoclave and heated at 130° C. for 6 hours. As a result, a gel substance was formed in the container, which was no more fluid.

EXAMPLE 10

100 g of the alkaline aqueous silica sol having an $SiO_2$ concentration of 21% by weight, as obtained in Example 1, and 100 g of the alkaline aqueous silica sol having an $SiO_2$ concentration of 21.9% by weight, as obtained in Comparative Example 1, were mixed, and the resulting mixture was stored in a sealed container at room temperature. It was stable for 6 months or more.

EXAMPLE 11

Pure water was added to a commercial JIS No. 3 sodium water glass (molar ratio of $SiO_2/Na_2O$: 3.22, $SiO_2$ content: 28.5% by weight) to obtain an aqueous sodium silicate solution having an $SiO_2$ concentration of 3.3% by weight. The aqueous sodium silicate solution was passed through a column filled with a cationic exchange resin (trade name of Amberlite 120B), to obtain an active silicic acid-containing aqueous colloid liquid having an $SiO_2$ concentration of 3.2% by weight, a pH value of 2.91 and an electroconductivity of 667 μS/cm. The liquid contained $Al_2O_3$ and $Fe_2O_3$ as retained therein in a total amount of 67 ppm. 2000 g of the said active silicic acid-containing aqueous colloidal liquid was put in a glass container and then 1.1 g of aqueous 10 wt. % sodium hydroxide solution was added thereto with stirring at room temperature, and stirring was thereafter continued for 10 minutes. The active silicic acid-containing aqueous colloidal liquid had a pH value of 4.15. Next, 12.1 g of aqueous 10 wt. % calcium nitrate was added thereto with stirring at room temperature, and after 10 minutes, 13.1 g of aqueous 10 wt. % sodium hydroxide solution was added thereto also with stirring at room temperature. The thus obtained mixture had an $SiO_2$ content of 3.18% by weight, a pH value of 8.08, a molar ratio of $SiO_2/Na_2O$ of 60 and a CaO content of 206 ppm. The mixture was fed into a 2.5 liter stainless steel autoclave and heated at 130° C. for 6 hours. The resulting silica sol was proved, by electromicroscopic observation, to contain colloidal silica particles having an elongated shape. The particles had a thickness of about 10 mμ and a length of from 60 to 200 mμ. They had a particle size of 74.9 mμ as measured by dynamic light-scattering method. They also had a particle size of 12.6 mμ as calculated out by BET method. The sol contained an $SiO_2$ content of 3.18% by weight and had a molar ratio of $SiO_2/Na_2O$ (by titrimetric method) of 93 and a pH value of 9.90. It contained no gel. Next, the thus prepared thin silica sol liquid containing colloidal silica particles with an elongated shape was concentrated by passing through an ultrafiltration apparatus at room temperature to give a concentrated silica sol having an $SiO_2$ concentration of 20.5% by weight. The resulting sol had a specific gravity of 1.132, a pH value of 9.59, a viscosity of 46.5 cp, a molar ratio of $SiO_2/Na_2O$ (by titrimetric method) of 107, a CaO content of 0.13% by weight, a Cl content of 58 ppm, an $SO_4$ content of 39 ppm, an $NO_3$ content of 489 ppm and an electroconductivity of 2610 μS/cm. After concentration, there was no change in the shape of the particles in the concentrated silica sol. The thus concentrated silica sol was stored in a sealed container at 60° C., which was found stable after one month. The sol was coated on a glass plate and dried, which formed a better film than that formed from a conventional sol.

EXAMPLE 12

2000 g of the same active silicic acid-containing aqueous colloidal liquid as that used in Example 11 ($SiO_2$: 3.2% by weight, pH: 2.91; electroconductivity: 667 μS/cm) was put in a glass container, and 1.2 g of aqueous 10 wt. % sodium hydroxide was added thereto with stirring at room temperature, and thereafter stirring was continued for 10 minutes. The resulting active silicic acid-containing aqueous colloidal liquid had a pH value of 4.30. Next, 11.7 g of aqueous 10 wt. % calcium nitrate solution was added thereto with stirring at room temperature, and after 10 minutes, 13.0 g of aqueous 10 wt. % sodium hydroxide solution was further added thereto also with stirring at room temperature. The thus obtained mixture had an $SiO_2$ content of 3.18% by weight, a pH value of 8.14, a molar ration of $SiO_2/Na_2O$ of 60 and a CaO content of 200 ppm. The mixture was fed into a 2.5 liter stainless steel autoclave and heat-treated at 170° C. for one hour. The resulting silica sol was proved, by electromicroscopic observation, to contain colloidal silica particles having an elongated shape. The particles had a thickness of about 12 mμ and a length of from 60 to 300 mμ. They had a particle diameter of 117 mμ as measured by dynamic light-scattering method. They also had a particle diameter of 14 mμ as calculated out by BET method. The sol contained an $SiO_2$ content of 3.18% by weight and had a molar ratio of $SiO_2/Na_2O$ (by titrimetric method) of 103 and a pH value of 10.31. It contained no gel. Next, the thus prepared thin silica sol liquid containing colloidal silica particles with an elongated shape was concentrated by passing through an ultrafiltration apparatus at room temperature to give a concentrated silica sol having an $SiO_2$ concentration of 10.0% by weight. The resulting sol had a specific gravity of 1.061, a pH value of 10.06, a viscosity of 25 cp, a molar ratio of $SiO_2/Na_2O$ (by titrimetric method) of 109, a CaO content of 0.07% by weight, a Cl content of 30 ppm, an $SO_4$ content of 19 ppm, an $NO_3$ content of 260 ppm and an electroconductivity of 1420 μS/cm. After concentration, there was no change in the shape of the particles in the concentrated silica sol. The thus concentrated silica sol was stored in a sealed container at 60° C., which was found stable after one month. The sol was coated on a glass plate and dried, which formed a better film than that formed from a conventional sol.

EXAMPLE 13

Pure water was added to the same active silicic acid-containing aqueous colloidal liquid as that used in Example 11 ($SiO_2$: 3.2% by weight, pH: 2.91, electroconductivity: 667 μS/cm) to prepare a diluted active silicic acid-containing liquid having an $SiO_2$ concentration of 1.6% by weight, a pH value of 2.90 and an electroconductivity of 670 μS/cm. 2000 g of the diluted active silicic acid-containing liquid was put in a glass container, and 1.0 g of aqueous 10 wt. % sodium hydroxide solution was added thereto with stirring at room temperature, and stirring was continued for 10 minutes. The resulting active silicic acid-containing aqueous colloidal liquid had a pH value of 4.10. Next, 8.8 g of aqueous 10 wt. % calcium nitrate solution was added thereto with stirring at room temperature, and, after 10 minutes, 7.89 g of aqueous 10 wt. % sodium hydroxide solution was further added thereto also with stirring at room temperature. The thus obtained mixture had an $SiO_2$ content of 1.59% by weight, a pH value of 7.84, a molar ratio of $SiO_2/Na_2O$ of 60 and a CaO content of 150 ppm. The mixture was fed into a 2.5 liter stainless steel autoclave and heat-treated at 130° C. for 6 hours. The resulting silica sol was proved, by electromicroscopic observation, to contain colloidal silica particles having an elongated shape. The particles had a thickness of about 10 mμ and a length of from 60 to 250 mμ. They had a particle size of 89.8 mμ as measured by dynamic light-scattering method. They also had a particle size of 12.8 mμ as calculated out by BET method. The sol contained an $SiO_2$ content of 1.59% by weight and had a molar ratio of $SiO_2/Na_2O$ (by titrimetric method) of 95 and a pH value of 9.47. It contained no gel. Next, the thus prepared thin silica sol liquid containing colloidal silica particles with an elongated shape was concentrated by passing through an ultrafiltration apparatus at room temperature to give a concentrated silica sol having an $SiO_2$ concentration of 10.1% by weight. The resulting sol had a specific gravity of 1.061, a pH value of 9.16, a viscosity of 32 cp, a molar ratio of $SiO_2/Na_2O$ (by titrimetric method) of 110, a CaO content of 0.08%, a Cl content of 27 ppm, an $NO_3$ content of 290 ppm, an $SO_4$ content of 12 ppm and an electroconductivity of 1200 μS/cm. After concentration, there was no change in the shape of the particles in the concentrated silica sol. The thus concentrated silica sol was stored in a sealed container at 60° C., which was found stable after one month. The sol coated on a glass plate and dried, which formed a better film than that formed from a conventional sol.

COMPARATIVE EXAMPLE 6

Pure water was added to the same active silicic acid-containing aqueous colloidal liquid as that used in Example 11 ($SiO_2$: 3.2% by weight, pH: 2.91, electroconductivity: 667 μS/cm) to prepare a diluted active silicic acid-containing liquid having an $SiO_2$ concentration of 2.0% by weight, a pH value of 2.90 and an electroconductivity of 820 μS/cm. 2000 g of the diluted active silicic acid-containing liquid was put in a glass container, and 1.0 g of aqueous 10 wt. % sodium hydroxide solution was added thereto with stirring at room temperature, and stirring was continued for 10 minutes. The resulting active silicic acid-containing aqueous colloidal liquid had a pH value of 4.32. Next, 30 g of aqueous 10 wt. % calcium nitrate solution was added thereto with stirring at room temperature, and, after 10 minutes, 7.89 g of aqueous 10 wt. % sodium hydroxide solution was further added thereto also with stirring at room temperature. The thus obtained mixture had an $SiO_2$ content of 1.98% by weight, a pH value of 7.42, a molar ratio of $SiO_2/Na_2O$ of 60 and a CaO content of 500 ppm. The mixture was fed into a 2.5 liter stainless steel autoclave and heat-treated at 130° C. for 6 hours. As a result, a gel substance was formed in the container, which was no more fluid.

EXAMPLE 14

Figure 4:
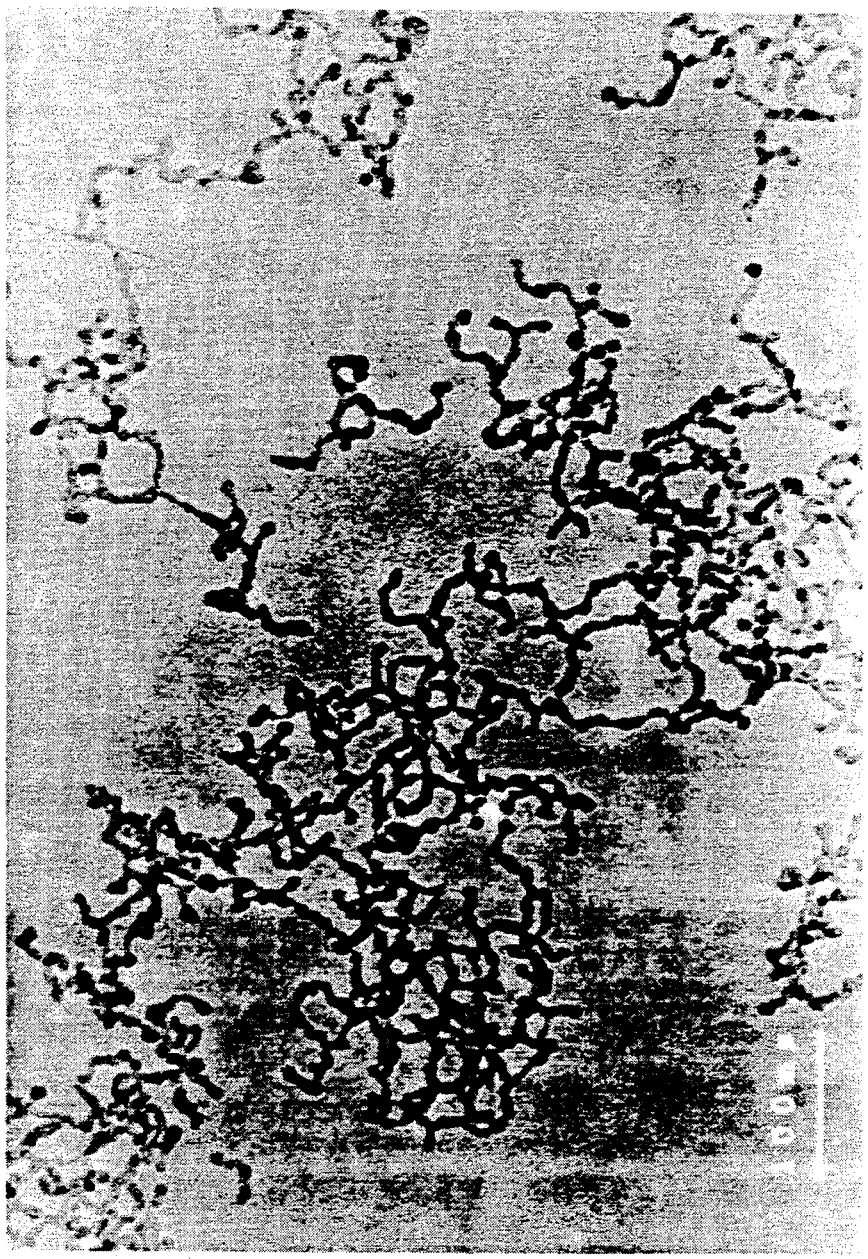
FIG. 4 is a 200,000 magnification-transmission electro-microscopic photograph showing the particle structure of the colloidal silica of the sol, before concentration, of the present invention obtained in Example 14.

Pure water was added to an acidic silica sol obtained by treating a commercial alkaline aqueous sol (particle size by Seares method: 5 m$\mu$, $SiO_2$ concentration: 20% by weight, specific gravity: 1.129, pH: 9.4, viscosity: 4 cp) with a hydrogen type cationic exchange resin to prepare an acidic silica sol having an $SiO_2$ concentration of 3.2% by weight and a pH value of 3.27. 2000 g of the acidic silica sol was put in a 3 liter glass container, and 12.6 g of aqueous 10 wt. % calcium nitrate solution was added thereto with stirring at room temperature, and stirring was continued for 10 minutes. Next, 14.20 g of aqueous 10 wt. % sodium hydroxide solution was further added thereto also with stirring at room temperature, and stirring was continued for 10 minutes. The resulting mixture had an $SiO_2$ content of 3.16% by weight, a pH value of 9.3, a molar ratio of $SiO_2/Na_2O$ of 60 and a CaO content of 215 ppm. Next, the mixture was fed into a 2.5 liter stainless steel autoclave and heat-treated at 130° C. for 6 hours. The resulting sol was proved, by electromicroscopic observation, to contain colloidal silica particles having an elongated shape. The particles had a thickness of about 10 m$\mu$ and a length of from 50 to 300 m$\mu$. They had a particle size of 65 m$\mu$ as measured by dynamic light-scattering method. They also had a particle size of 12.3 m$\mu$ as calculated out by BET method. FIG. 4 shows a 200,000 magnification photograph of the colloidal silica particles of the sol, as taken with an electronic microscope. The sol had an $SiO_2$ content of 3.16% by weight, a molar ratio of $SiO_2/Na_2O$ (by titrimetric method) of 78 and a pH value of 9.6. It contained no gel. Next, the thus prepared thin silica sol liquid containing colloidal silica particles with an elongated shape was concentrated by passing through an ultrafiltration apparatus at room temperature to give a concentrated silica sol having an $SiO_2$ concentration of 16% by weight. The resulting sol had a specific gravity of 1.100, a pH value of 9.54, a viscosity of 72 cp, a molar ratio of $SiO_2/Na_2O$ (by titrimetric method) of 90.7, a CaO content of 0.11% by weight, a Cl content of 2.8 ppm, an $SO_4$ content of 34 ppm, an $NO_3$ content of 273 ppm and an electroconductivity of 2010 $\mu$S/cm. After concentration, there was no change in the shape of the particles in the concentrated silica sol. The thus concentrated silica sol was stored in a sealed container at 60° C., which was found stable after one month. The sol was coated on a glass plate and dried, which formed a better film than that formed from a conventional sol.

EXAMPLE 15

Pure water was added to a commercial acidic aqueous sol containing spherical colloidal silica particles (particle size by BET method: 12 m$\mu$, $SiO_2$ content: 20% by weight, specific gravity: 1.129, pH: 2.9, viscosity: 2 cp) to prepare a diluted acidic silica sol liquid having an $SiO_2$ concentration of 3.2% by weight and a pH value of 3.65. 2000 g of the thus diluted acidic silica sol was put in a 3 liter glass container, and 11.7 g of aqueous 10 wt. % calcium nitrate solution was added thereto with stirring and stirring was continued at room temperature for 10 minutes. 14.2 g of aqueous 10 wt. % sodium hydroxide solution was further added thereto also with stirring at room temperature and stirring was continued for 10 minutes. The resulting mixture had an $SiO_2$ content of 3.16% by weight, a pH value of 10.47, a molar ratio of $SiO_2/Na_2O$ of 60 and a CaO content of 200 ppm. Next, the mixture was fed into a 2.5 liter stainless steel autoclave and heat-treated at 130° C. for 6 hours. The resulting sol was proved, by electromicroscopic observation, to contain colloidal silica particles having an elongated shape. The particles had a thickness of 15 m$\mu$ and a length of from 50 to 300 m$\mu$. They had a particle size of 146 m$\mu$ as measured by dynamic light-scattering method. They also had a particle size of 14.7 m$\mu$ as calculated out by BET method. The sol contained an $SiO_2$ content of 3.16% by weight and had a molar ratio of $SiO_2/Na_2O$ (by titrimetric method) of 70 and a pH value of 10.18. It contained no gel. Next, the thus prepared thin silica sol liquid containing colloidal silica particles with an elongated shape was concentrated by passing through an ultrafiltration apparatus at room temperature to give a concentrated silica sol having an $SiO_2$ concentration of 10.2% by weight. The resulting sol had a specific gravity of 1.063, a pH value of 9.98, a viscosity of 42 cp, a molar ratio of $SiO_2/Na_2O$ (by titrimetric method) of 89, a CaO content of 0.07% by weight, a Cl content of 3 ppm, an $SO_4$ content of 34 ppm, an $NO_3$ content of 273 ppm and an electroconductivity of 1900 $\mu$S/cm. After concentration, there was no change in the shape of the particles in the concentrated silica sol. The thus concentrated silica sol was stored in a sealed container at 60° C., which was found stable after one month. The sol was coated on a glass plate and dried, which formed a better film than that formed from a conventional sol.

EXAMPLE 16

Pure water was added to an acidic aqueous silica sol obtained by treating a commercial alkaline aqueous sol containing spherical colloidal silica particles (particle size by BET method: 8 m$\mu$, $SiO_2$ content: 30% by weight, pH: 9.9, specific gravity: 1.21, viscosity: 5 cp) with a hydrogen type cationic exchange resin, to prepare a diluted acidic aqueous silica sol having an $SiO_2$ concentration of 3.6% by weight and a pH value of 3.52. 2000 g of the thus diluted acidic silica sol liquid was put in a 3 liter glass container, and 9.0 g of aqueous 10 wt. % magnesium chloride solution was added thereto with stirring and stirring was continued at room temperature for 10 minutes. Next, 13.7 g of aqueous 10 wt. % sodium hydroxide solution was further added thereto also with stirring at room temperature and stirring was continued for 10 minutes. The resulting mixture had an $SiO_2$ content of 3.57% by weight, a pH value of 9.83, a molar ratio of $SiO_2/Na_2O$ of 70 and an MgO content of 190 ppm. Next, the mixture was fed into a 3 liter stainless steel autoclave and heat-treated at 140° C. for 10 hours. The resulting silica sol was proved, by electromicroscopic observation, to contain colloidal silica particles having an elongated shape. The particles had a thickness of about 11 m$\mu$ and a length of from 40 to 250 m$\mu$. They had a particle size of 88 m$\mu$ as measured by dynamic light-scattering method. They also had a particle size of 12.9 mμ as calculated out by BET method. The sol contained an SiO$_2$ content of 3.57% by weight and had a molar ratio of SiO$_2$/Na$_2$O (by titrimetric method) of 81 and a pH value of 9.83. It contained no gel. Next, the thus prepared thin silica sol liquid containing colloidal silica particles with an elongated shape was concentrated by passing through an ultrafiltration apparatus at room temperature to give a concentrated silica sol having an SiO$_2$ concentration of 15.6% by weight. The resulting sol had a specific gravity of 1.098, a pH value of 9.70, a viscosity of 83 cp, a molar ratio of SiO$_2$/Na$_2$O (by titrimetric method) of 103, an MgO content of 823 ppm, a Cl content of 171 ppm, an SO$_4$ content of 22 ppm, an NO$_3$ content of 4 ppm and an electroconductivity of 2095 μS/cm. After concentration, there was no charge in the shape of the particles in the concentrated silica sol. The thus concentrated silica sol was stored in a sealed container at 60° C., which was found stable after one month. The sol was coated on a glass plate and dried, which formed a better film than that formed from a conventional sol.

EXAMPLE 17

Pure water was added to the acidic aqueous silica sol obtained by treating the same commercial alkaline aqueous silica sol as that used in Example 14 with a hydrogen type cationic exchange resin, to prepare a diluted acidic silica sol liquid having an SiO$_2$ concentration of 3.2% by weight and a pH value of 3.27. 2000 g of the thus diluted silica sol liquid was put in a 3 liter glass container, and 4.0 g of aqueous 10 wt. % calcium chloride solution was added thereto with stirring and stirring was continued at room temperature for 10 minutes. Next, 2.44 g of monoethanolamine was further added thereto also with stirring at room temperature and stirring was continued for 10 minutes. The resulting mixture had an SiO$_2$ content of 3.19% by weight, a pH value of 9.35, a molar ratio of SiO$_2$/monoethanolamine of 27 and a CaO content of 100 ppm. Next, the mixture was fed into a 3 liter stainless steel autoclave and heat-treated at 135° C. for 10 hours. The resulting silica sol was proved, by electromicroscopic observation, to contain colloidal silica particles having an elongated shape. The particles had a thickness of from 10 to 15 mμ and a length of from 50 to 200 mμ. They had a particle size of 54.0 mμ as measured by dynamic light-scattering method. They also had a particle size of 10.3 mμ as calculated out by BET method. The sol contained an SiO$_2$ content of 3.19% by weight and had a molar ratio of SiO$_2$/monoethanolamine (by titrimetric method) of 36 and a pH value of 9.45. It contained no gel. Next, the thus prepared thin silica sol liquid containing colloidal silica particles with an elongated shape was concentrated by passing through an ultrafiltration apparatus at room temperature to give a concentrated silica sol having an SiO$_2$ concentration of 1.52% by weight. The resulting sol had a specific gravity of 1.098, a pH value of 9.21, a viscosity of 8 cp, a molar ratio of SiO$_2$/monoethanolamine (by titrimetric method) of 47, a CaO content of 470 ppm, a Cl content of 3 ppm, an SO$_4$ content of 35 ppm, an NO$_3$ content of 290 ppm and an electroconductivity of 1300 μS/cm. After concentration, there was no change in the shape of the particles in the concentrated silica sol. The thus concentrated silica sol was stored in a sealed container at 60° C., which was found stable after one month. The sol was coated on a glass plate and dried, which formed a better film than that obtained from a conventional sol.

EXAMPLE 18

Pure water was added to the same commercial acidic aqueous silica sol as that used in Example 15 to prepare a diluted acidic silica sol liquid having an SiO$_2$ concentration of 10% by weight and a pH value of 3.1. 2000 g of the diluted acidic silica sol was put in a 3 liter glass container, and 23.4 g of 10 wt. % calcium nitrate solution was added thereto with stirring and stirring was continued at room temperature for 10 minutes. 26.2 g of aqueous 10 wt. % sodium hydroxide solution was further added thereto also with stirring at room temperature and stirring was continued for 10 minutes. The resulting mixture had an SiO$_2$ content of 9.76% by weight, a pH value of 9.79, a molar ratio of SiO$_2$/Na$_2$O of 100 and a CaO content of 400 ppm. Next, the mixture was fed into a 2.5 liter stainless steel autoclave and heat-treated at 200° C. for 6 hours. The resulting silica sol was proved, by electromicroscopic observation, to contain colloidal silica particles having an elongated shape. The particles had a thickness of about 20 mμ and a length of from 100 to 400 mμ. They had a particle size of 203 mμ as measured by dynamic light-scattering method. They also had a particle size of 26.4 mμ as calculated out by BET method. The sol contained an SiO$_2$ content of 9.76% by weight and had a specific gravity of 1.061, a pH value of 10.22, a viscosity of 12 cp, a molar ratio of SiO$_2$/Na$_2$O (by titrimetric method) of 117, a CaO content of 400 ppm, a Cl content of 3 ppm, an SO$_4$ content of 7 ppm, an NO$_3$ content of 880 ppm and an electroconductivity of 2170 μS/cm. It contained no gel. Next, the concentrated silica sol was stored in a sealed container at 60° C., which was found stable after one month. The sol was coated on a glass plate and dried, which formed a better film than that obtained from a conventional sol.

COMPARATIVE EXAMPLE 7

Water was added to a commercial acidic aqueous silica sol containing spherical colloidal silica particles (average particle diameter: 40 mμ, SiO$_2$ content: 20 wt. %, specific gravity: 1.120, pH: 3.0, viscosity: 2 cp) to prepare a diluted acidic silica sol liquid having an SiO$_2$ concentration of 3.2% by weight and a pH value of 3.1. 2000 g of the diluted acidic silica sol liquid was put in a 3 liter glass container, and 10.5 g of aqueous 10 wt. % calcium nitrate solution was added thereto with stirring and stirring was continued at room temperature for 10 minutes. 12.2 g of aqueous 10 wt. % sodium hydroxide solution was further added thereto also with stirring at room temperature and stirring was continued for 10 minutes. The resulting mixture had an SiO$_2$ content of 3.16% by weight, a pH value of 9.3, a molar ratio of SiO$_2$/Na$_2$O of 70 and a CaO content of 180 ppm. Next, the mixture was fed into a 2.5 liter stainless steel autoclave and heat-treated at 130° C. for 6 hours. As a result of electromicroscopic observation of the resulting silica sol, the colloidal particles in the sol were found to be spherical particles which were linked to each other. The particles were not extended with a uniform thickness.

COMPARATIVE EXAMPLE 8

The same commercial acidic aqueous silica sol as that used in Example 14 was concentrated by ultrafiltration to give a concentrated silica sol (particle diameter by BET method: 12 mμ, SiO$_2$ content: 30% by weight, specific gravity: 1.1208, pH: 2.9, viscosity: 2.5 cp). 2000 g of the thus concentrated silica sol was put in a 3 liter glass container, and 87.9 g of aqueous 10 wt. % calcium nitrate solution was added thereto with stirring and stirring was continued at room temperature for 10 minutes. 80 g of aqueous 10 wt. % sodium hydroxide solution was further added thereto also with stirring at room temperature and stirring was continued for 10 minutes. The mixture had an $SiO_2$ content of 27.7% by weight, a pH value of 9.85, a molar ratio of $SiO_2/Na_2O$ of 100 and a CaO content of 1500 ppm. Next, the mixture was fed into a 2.5 liter stainless steel autoclave and heat-treated at 130° C. for 6 hours. As a result, a gel was formed in the container, which was no more fluid.

As is obvious from the above-mentioned explanation and examples, the sol of the present invention has an improved property and is superior to any other conventional silica sol in various uses. Components which may be added to conventional silica sols for preparing compositions may also be added to the silica sol of the present invention, and the resulting composition has higher tackifying property and gelling property than the corresponding conventional compositions. As examples of components which may be used together with the silica sol of the present invention, there may be mentioned the aforesaid conventional and known spherical silica sols, non-spherical silica sols prepared by peptization method, alkali metal silicates, hydrolyzed liquids of alkyl silicates, alumina sols, other metal oxide sols, water-soluble resins, resin emulsions, tackifiers, defoaming agents, surfactants, refractory powders, metal powders, bentonite, pigments, coupling agents and so on.

When the silica sol of the present invention is mixed with various materials for coating compositions which have heretofore been used, inorganic coating compositions, heat-resistant coating compositions, anti-corrosive coating compositions and inorganic-organic composite coating compositions can be prepared. The dry film formed by coating a composition containing the silica sol of the present invention has few pin holes and is almost free from cracks. The coated film is sufficiently smooth and even and is soft so as to be able to absorb a shock as applied thereto. In addition, the coated film is also excellent in the adhesiveness to the substrate, the water-retentivity and anti-static capacity. Further, the baked film formed from an inorganic coating composition containing the silica sol of the present invention has a good heat-resistance.

Incorporation of various adhesive components to the silica sol of the present invention gives inorganic adhesives, heat-resistance adhesives and inorganic-organic composite adhesives.

The said coating compositions and adhesives containing the silica sol of the present invention may be applied to the surface of various substrates, for example, glasses, ceramics, metals, plastics, woods, fibers and papers.

The silica sol of the present invention may be impregnated into felt-like substances such as usual glass fibers, ceramic fibers and other inorganic fibers. The silica sol of the present invention may be mixed with these short fibers. When the felt-like substance impregnated with the silica sol of the present invention is dried, felt-like substance having high strength can be obtained. When the mixture of the silica sol of the present invention and the above-mentioned short fiber(s) is formed into shapes of sheet, mat and so on and then dried, sheets, mats and molded products having high strength can also be obtained. There is no occurrence of any dusting on the surfaces of these thus obtained felt-like products, sheets, mats and other molded products, as occurs in the case of using the conventional silica sols. Accordingly, the colloidal silica particles of silica sol of the present invention which are used as binding agent commonly for these inorganic fibers and so on show the fact that there is little migration from the inside of these inorganic fibers-product to the surface thereof. These dried products may be provided for the use of heat-resisting thermal insulators and others as an improved product.

The silica sol of the present invention can also be used as a surface-treating agent for substrates having a porous texture. For instance, when applied to the surface of a hardened article of concrete, mortar, cement, gypsum or clay, the silica sol penetrates from the surface into the inside of the article, and after being dried, it gives an improved surface layer on the article. The silica sol of the present invention may also be used as a surface-treating agent for natural and synthetic fibers, fibrous products thereof, papers and woods. It may also be used as a sealant for metal castings.

Moulds for metal casting may be prepared from a slurry containing the silica sol of the present invention and a refractory powder. The slurry may rapidly be gelled, when dried, at a high gelling speed, so that the productivity of moulds from the slurry is high. In addition, the cracking percentage in production of moulds from the slurry is low.

When the silica sol of the present invention is mixed with an organic resin emulsion or a resin solution and then the dispersion medium is removed from the resulting mixture, a resin composition containing silica in the resins may be obtained. As the resin compositions have favorable properties, such as high strength, stain-resistance, high surface hardness and hydrophilicity, improved fibers, films or shaped articles may be obtained from the said mixture of resin composition. In addition, preferred resin compositions, fibers, films and shaped articles may also be obtained by dispersing the colloidal silica particles of the silica sol of the present invention in a polymerizable monomer and then polymerizing the resulting monomer mixture.

When the silica sol of the present invention is added to a catalyst carrier component, adsorbent component or shaping refractory component and the resulting mixture is shaped, a preferred catalyst carrier, adsorbent or refractory article may be shaped.

The silica sol of the present invention may also be used as a tackifier or gelling agent. For instance, the silica sol of the present invention may be added to an acid, which is to be used in the form of a paste or plastic, such as phosphoric acid, oxalic acid, butyric acid or chromic acid, whereby the intended pasty or plastic acid may be prepared. The silica sol of the present invention can be added to a diluted sulfuric acid for an electrolytic solution for battery, whereby the acid may be gelled to be non-fluid and the electrolyte in the battery does not flow out even when the battery lies sideways. In order to strengthen a soft and weak ground, a grouting composition of a gelling liquid is injected into the ground. An improved grouting composition can be obtained by adding a gelling agent such as salts to the silica sol of the present invention. Accordingly, strengthening of a soft and weak ground as well as water flow-resistance may be attained by the use of the improved grouting composition.

The silica sol of the present invention has a high stability and has a property of being finally and irreversibly converted into a gel by removal of the medium therefrom. Since the colloidal silica particles constituting the sol have an elongated shape, as mentioned above, the resulting gel displays a unique and particular characteristic to be derived from the sol, during gellation of the sol or after the gel has been hardened. It may easily be understood by one skilled in the art that the sol of the present invention is useful for other various uses in addition to the above-mentioned ones.

While the invention has been described in detail and with reference to specific embodiments thereof, it will be apparent to one skilled in the art that various changes and modifications can be made therein without departing from the spirit and scope thereof.

What is claimed is:

1. A method for preparing a stable alkaline aqueous silica sol having an $SiO_2$ concentration of from 1 to 6% by weight, in which the colloidal particles of said silica have a particle size of 40 to 300 millimicrons as measured by dynamic light-scattering, and have an elongated shape having a uniform thickness of 5 to 20 millimicrons and an elongation of 5 to 30 times the thickness in only one plane, comprising the following steps (a), (b) and (c):

(a) mixing at a temperature of 2° to 50° C. an aqueous solution containing at least one compound selected from the group consisting of water-soluble calcium salt and magnesium salt with an aqueous colloidal liquid of an active silicic acid containing from 1 to 6% by weight of $SiO_2$ but not containing colloidal silica particles having a size larger than 3 millimicrons and having a pH value of from 2 to 4 in an amount of from 1500 to 8500 ppm as a weight ratio of CaO or MgO or a mixture thereof with respect to $SiO_2$ of the said active silicic acid;

(b) mixing at 2° to 50° C. an aqueous solution of at least one compound selected from the group consisting of alkali metal hydroxides, water-soluble organic bases, water-soluble silicates of alkali metal hydroxide and water-soluble silicates of water-soluble organic base with the aqueous solution obtained in step (a) in a molar ratio of $SiO_2/M_2O$ from 20 to 200, where $SiO_2$ indicates the total silica content derived form said active silicic acid and the silica content of said water-soluble silicate, and M indicates an alkali metal atom of said alkali metal hydroxide or an organic base molecule of said water-soluble organic base; and (c) heating the mixture obtained step (b) at 60° to 150° C. for 0.5 to 40 hours.

2. The method of claim 1 for preparing a stable alkaline aqueous silica sol, wherein said active silicic acid-containing aqueous colloidal liquid to be used in step (a) is one obtained by bringing an aqueous solution of sodium water glass having a molar ratio of $SiO_2/Na_2O$ from 1 to 4.5 and an $SiO_2$ concentration of from 1 to 6% by weight into contact with a hydrogen type cationic exchange resin.

3. The method of claim 1 for preparing a stable alkaline aqueous silica sol, wherein said aqueous solution in step (a) comprises at least one compound selected from the group consisting of calcium chloride, magnesium chloride, calcium nitrate, magnesium nitrate, magnesium sulfate, calcium sulfamate, magnesium sulfamate, calcium formate, magnesium formate, calcium acetate and magnesium acetate in an amount of from 2 to 20% by weight.

4. The method of claim 1 for preparing a stable alkaline aqueous silica sol, wherein said at least one compound in step (b) comprises at least one compound selected from the group consisting of sodium hydroxide, potassium hydroxide, lithium hydroxide, tetraethanolammonium hydroxide, monomethyltriethanolammonium hydroxide, tetramethylammonium hydroxide, monoethanolamine, diethanolamine, triethanolamine, N,N-dimethylethanolamine, N-($\beta$-aminomethyl)ethanolamine, N-methylethanolamine, propanolamine, morpholine, silicates of organic base, sodium silicate and potassium silicate.

5. A method for preparing a stable alkaline aqueous silica sol having an $SiO_2$ concentration of from 1 to 6% by weight, in which the colloidal particles of said silica have a particle size of 40 to 300 millimicrons as measured by dynamic light-scattering, and have an elongated shape having a uniform thickness of 5 to 20 millimicrons and an elongation of 5 to 30 times the thickness in only one plane, comprising the following steps (a), (b) and (c):

(a) mixing at a temperature of 2° to 50° C. an aqueous solution containing at least one compound selected from the group consisting of water-soluble calcium salt and magnesium salt with an aqueous colloidal liquid of an active silicic acid containing from 1 to 6% by weight of $SiO_2$ but not containing colloidal silica particles having a size larger than 3 millimicrons and having a pH value higher than 4 and up to 5 in an amount of from 1500 to 8500 ppm as a weight ratio of CaO or MgO or a mixture of said CaO and MgO to $SiO_2$ of the said active silicic acid;

(b) mixing at 2° to 50° C. an aqueous solution of at least one compound selected from the group consisting of alkali metal hydroxides, water-soluble organic bases, water-soluble silicates of alkali metal hydroxide and water-soluble silicates of water-soluble organic base with the aqueous solution obtained in step (a) in a molar ration of $SiO_2/M_2O$ from 20 to 200, where $SiO_2$ indicates the total silica content derived from said active silicic acid and from said silicate, and M indicates an alkali metal atom of said alkali metal hydroxide or an organic base molecule of said organic base; and (c) heating the mixture obtained in step (b) at 60° to 250° C. for 0.5 to 40 hours.

6. The method of claim 5 for preparing a stable alkaline aqueous silica sol, wherein said active silicic acid-containing aqueous colloidal liquid to be used in step (a) is one obtained by bringing an aqueous solution of sodium water glass having a molar ratio of $SiO_2/Na_2O$ from 1 to 4.5 and an $SiO_2$ concentration of from 1 to 6% by weight into contact with a hydrogen type cationic exchange resin, said active silicic acid-containing aqueous colloidal liquid having an $SiO_2$ concentration of from 1 to 6% by weight and a pH value higher than 4 and up to 5, and not containing colloidal silica particles having a particle size of 3 millimicrons or more.

7. The method of claim 5 for preparing a stable alkaline aqueous silica sol, wherein said aqueous solution in step (a) comprises at least one compound selected from the group consisting of calcium chloride, magnesium chloride, calcium nitrate, magnesium nitrate, magnesium sulfate, calcium sulfamate, magnesium sulfamate, calcium formate, magnesium formate, calcium acetate and magnesium acetate in an amount of from 2 to 20% by weight.

8. The method of claim 5 for preparing a stable alkaline aqueous silica sol, wherein said at least one compound in step (b) comprises at least one compound selected from the group consisting of sodium hydroxide, potassium hydroxide, lithium hydroxide, tetraethanolammonium hydroxide, monomethyltriethanolammonium hydroxide, tetramethylammonium hydroxide, monoethanolamine, diethanolamine, triethanolamine, N,N-dimethylethanolamine, N-(β-aminomethyl)ethanolamine, N-methylethanolamine, propanolamine, morpholine, silicates of organic base, sodium silicate and potassium silicate.

9. A method for preparing a stable alkaline aqueous silica sol having an $SiO_2$ concentration of from 1 to 30% by weight, in which the colloidal particles of said silica have a particle size of 40 to 300 millimicrons as measured by dynamic light-scattering, and have an elongated shape having a uniform thickness of 5 to 20 millimicrons and an elongation of 5 to 30 times the thickness in only one plane, comprising the following steps (a), (b), (c) and (d):

(a) mixing at a temperature of 2° to 50° C. an aqueous solution containing at least one compound selected from the group consisting of water-soluble calcium salt and magnesium salt with an aqueous colloidal liquid of an active silicic acid containing from 1 to 6% by weight of $SiO_2$ but not containing colloidal particles having a size larger than 3 millimicrons and having a pH value of from 2 to 4 in an amount of from 1500 to 8500 ppm as a weight ratio of CaO or MgO or a mixture thereof with respect to $SiO_2$ of the said active silicic acid.

(b) mixing at 2° to 50° C. an aqueous solution of at least one compound selected from the group consisting of alkali metal hydroxides, water-soluble organic bases, water-soluble silicates of alkali metal hydroxide and water-soluble silicates of water-soluble organic base with the aqueous solution obtained in step (a) in a molar ratio of $SiO_2/M_2O$ form 20 to 200, where $SiO_2$ indicates the total silica content derived form said active silicic acid and the silica content of said water soluble silicate, and M indicates an alkali metal atom of said alkali metal hydroxide or an organic base molecule of said organic base; and (c) heating the mixture obtained in step (b) at 60° to 150° C. for 0.5 to 40 hours and then (d) removing anions and water from said silica sol prepared in step (c) to provide an anion concentration of 0.1% by weight or less and an $SiO_2$ concentration of from 1 to 30% by weight.

10. The method of claim 9 for preparing a stable alkaline aqueous silica sol, wherein said removal of said anions and water is effected by ultrafiltration.

11. The method of claim 10 for preparing a stable alkaline aqueous silica sol, further including the step of adding at least one compound selected from the group consisting of alkali metal hydroxides, water-soluble organic bases, water-soluble silicates of alkali metal hydroxide and water-soluble silicates of organic base to the silica sol obtained in step (d) so as to keep said molar ratio of $SiO_2/M_2O$ in the sol within the range of from 20 to 200.

12. The method of claim 11 for preparing a stable alkaline aqueous silica sol, wherein said at least one compound in step (b) comprises at least one compound selected from the group consisting of sodium hydroxide, potassium hydroxide, lithium hydroxide, tetraethanolammonium hydroxide, monomethyltriethanolammonium hydroxide, tetramethylammonium hydroxide, monoethanolamine, diethanolamine, triethanolamine, N,N-dimethylethanolamine, N-(β-aminomethyl)ethanolamine, N-methylethanolamine, monopropanolamine, morpholine, silicates of organic base, sodium silicate and potassium silicate.

13. The method of claim 9 for preparing a stable alkaline aqueous silica sol, wherein said removal of said anions and said water is effected by treatment of said silica sol with a hydroxy type anionic exchange resin so as to remove said anions therefrom followed by evaporation of the resulting sol to remove said water therefrom.

14. The method of claim 9 for preparing a stable alkaline aqueous silicate sol, wherein the aqueous colloidal liquid of an active silicic acid in step (a) is one obtained by bringing an aqueous solution of sodium water glass having a molar ratio of $SiO_2/Na_2O$ from 1 to 4.5 and an $SiO_2$ concentration of from 1 to 6% by weight into contact with a cationic exchange resin in the hydrogen form.

15. The method of claim 9 for preparing a stable alkaline aqueous silica sol, wherein the water-soluble salt of calcium or magnesium in step (a) is at least one selected from the group consisting of calcium chloride, magnesium chloride, calcium nitrate, magnesium nitrate, magnesium sulfate, calcium sulfamate, magnesium sulfamate, calcium formate, magnesium formate, calcium acetate, and magnesium acetate.

16. The method of claim 9 for preparing a stable alkaline aqueous silica sol, wherein the compound in step (b) is at least one selected from the group consisting of sodium hydroxide, potassium hydroxide, lithium hydroxide, tetraethanolammonium hydroxide, monomethyltriethanolammonium hydroxide, tetramethylammonium hydroxide, monoethanolamine, diethanolamine, triethanolamine, N,N-dimethyldiethanolamine, N-(β-aminomethyl)ethanolamine, N-methylethanolamine, propanolamine, morpholine, silicates of organic base, sodium silicate and potassium silicate.

17. A method for preparing a stable alkaline aqueous silica sol having an $SiO_2$ concentration of from 0.5 to 25% by weight, in which the colloidal particles of said silica have a particle size of 40 to 500 millimicrons as measured by dynamic light-scattering, and have an elongated shape having a uniform thickness of 5 to 40 millimicrons and an elongation of 5 to 30 times the thickness in only one plane, comprising the following steps (a'), (b') and (c'):

(a') mixing at a temperature of 2° to 50° C. an aqueous solution containing at least one compound selected from the group consisting of water-soluble calcium salt and magnesium salt with an aqueous acidic silica sol containing colloidal silica particles having an average particle diameter of from 3 to 30 millimicrons, said acidic silica sol having from 0.5 to 25% of $SiO_2$ by weight and having a pH value of from 1 to 5, in an amount of from 0.15 to 1.00% by weight of CaO, MgO or a mixture of said CaO and MgO to $SiO_2$ of said acidic silica sol;

(b') mixing at 2° to 50° C. an aqueous solution of at least one compound selected form the group consisting of alkali metal hydroxides, water-soluble organic bases, water-soluble silicates of alkali metal hydroxide and water-soluble silicates of organic base with said liquid as obtained in step (a') in a molar ratio of SiO$_2$/M$_2$O from 20 to 300, where SiO$_2$ indicates the total silica content derived from said acidic silica sol and from said silicate, and M indicates an alkali metal atom of the said alkali metal hydroxide or an organic base molecule of said organic base; and (c') heating the mixture obtained in step (b') at 60° to 300° C. for 0.5 to 40 hours to form said colloidal silica particles in said heated mixture having an elongated shape and having a thickness larger than the particle size of said colloidal silica particles of said step (a').

18. The method of claim 17 for preparing a stable alkaline aqueous silica sol, wherein said aqueous solution in step (a') comprises at least one compound selected from the group consisting of calcium chloride, magnesium chloride, calcium nitrate, magnesium nitrate, magnesium sulfate, calcium sulfamate, magnesium sulfamate, calcium formate, magnesium formate, calcium acetate and magnesium acetate in an amount of from 2 to 20% by weight of said aqueous solution.

19. The method of claim 17 for preparing a stable alkaline aqueous silica sol, wherein said at least one compound in step (b') comprises at least one compound selected from the group consisting of sodium hydroxide, potassium hydroxide, lithium hydroxide, tetraethanolammonium hydroxide, monomethyltriethanolammonium hydroxide, tetramethylammonium hydroxide, monoethanolamine, diethanolamine, triethanolamine, N,N-dimethylethanolamine, N-($\beta$-aminomethyl)ethanolamine, N-methylethanolamine, monopropanolamine, morpholine, silicates of organic base, sodium silicate and potassium silicate.

20. A method for preparing a stable alkaline aqueous silica sol having an SiO$_2$ concentration of from 1 to 40% by weight, in which the colloidal particles of said silica have a particle size of 40 to 500 millimicrons as measured by dynamic light-scattering, and have an elongated shape having a uniform thickness of 5 to 40 millimicrons and an elongation of 5 to 30 times the thickness in only one plane, comprising the following steps (a'), (b'), (c') and (d'):

(a') mixing at a temperature of 2° to 50° C. an aqueous solution containing at least one compound selected from the group consisting of water-soluble calcium salt and magnesium salt with an aqueous acidic silica sol containing colloidal silica particles having an average particle diameter of from 3 to 30 millimicrons, said acidic silica sol having from 0.5 to 25% of SiO$_2$ by weight and having a pH value of from 1 to 5, in an amount of from 0.15 to 1.00% by weight of CaO, MgO or a mixture of said CaO and MgO to SiO$_2$ of said acidic silica sol;

(b') mixing at 2° to 50° C. an aqueous solution of at least one compound selected from the group consisting of alkali metal hydroxides, water-soluble organic bases, water-soluble silicates of alkali metal hydroxide and water-soluble silicates of organic base with said liquid as obtained in step (a') in a molar ratio of SiO$_2$/M$_2$O from 20 to 300, where SiO$_2$ indicates the total silica content derived from said acidic silica sol and from said silicate, and M indicates an alkali metal atom of the said alkali metal hydroxide or an organic base molecule of said organic base; and (c') heating the mixture obtained in step (b') at 60° to 300° C. for 0.5 to 40 hours to form said colloidal silica particles in said heated mixture having an elongated shape and having a thickness larger than the particle size of said colloidal silica particles of said step (a'), and then (d') removing anions and water from said silica sol prepared in step (c') such that the anion concentration is 0.1% by weight or less and the SiO$_2$ concentration of said silica sol is from 1 to 40% by weight.

21. The method of claim 20 for preparing a stable alkaline aqueous silica sol, wherein said removal of said anions and water is effected by ultrafiltration.

22. The method of claim 21 for preparing a stable alkaline aqueous silica sol, further including the step of adding at least one compound selected from the group consisting of alkali metal hydroxides, water-soluble organic bases, water-soluble silicates of alkali metal hydroxide and water soluble silicates of organic base to the silica sol obtained in step (d') so as to keep said molar ratio of SiO$_2$/M$_2$O in the sol within the range of from 20 to 300.

23. The method of claim 22 for preparing a stable alkaline aqueous silica sol, wherein the compound added to the silica sol obtained in step (d') is at least one selected from the group consisting of sodium hydroxide, potassium hydroxide, lithium hydroxide, tetraethanolammonium hydroxide, monomethyltriethanolammonium hydroxide, tetramethylammonium hydroxide, monoethanolamine, diethanolamine, triethanolamine, N,N-dimethyldiethanolamine, N-($\beta$-aminomethyl)ethanolamine, N-methylethanolamine, propanolamine, morpholine, silicates of organic base, sodium silicate and potassium silicate.

24. The method of claim 20 for preparing a stable alkaline aqueous silica sol, wherein said at least one compound in step (b') comprises at least one compound selected from the group consisting of sodium hydroxide, potassium hydroxide, lithium hydroxide, tetraethanolammonium hydroxide, monomethyltriethanolammonium hydroxide, tetramethylammonium hydroxide, monoethanolamine, diethanolamine, triethanolamine, N,N-dimethylethanolamine, N-($\beta$-aminomethyl)ethanolamine, N-methylethanolamine, monopropanolamine, morpholine, silicates of organic base, sodium silicate and potassium silicate.

25. The method of claim 20 for preparing a stable alkaline aqueous silica sol, wherein said removal of said anions and said water is effected by treating said silica sol with a hydroxy type anionic exchange resin to remove the anions therefrom followed by evaporating the resulting silica sol to remove water therefrom.

26. The method of claim 20 for preparing a stable alkaline silica sol, wherein said aqueous solution of water-soluble salt of calcium or magnesium comprises at least one compound selected from the group consisting of calcium chloride, magnesium chloride, calcium nitrate, magnesium nitrate, magnesium sulfate, calcium sulfamate, magnesium sulfamate, calcium formate, magnesium formate, calcium acetate, and magnesium acetate.

27. A method for preparing a stable alkaline aqueous silica sol having an SiO$_2$ concentration of from 1 to 30% by weight, in which the colloidal particles of said silica have a particle size of 40 to 300 millimicrons as measured by dynamic light-scattering, and have an elongated shape having a uniform thickness of 5 to 20 millimicrons and an elongation of 5 to 30 times the thickness in only one plane, comprising the follow steps (a), (b), (c), and (d):

(a) mixing an aqueous solution of at least one compound selected from the groups consisting of water-soluble salt of calcium or magnesium with an aqueous colloidal liquid of an active silicic acid containing from 1 to 6% by weight of $SiO_2$ and not containing colloidal silica particles having a size larger than 3 millimicrons and having a pH value higher than 4 and up to 5 in an amount of from 1500 to 8500 ppm as a weight ratio of CaO or MgO or a mixture thereof with respect to $SiO_2$ of the said active silicic acid at a temperature of 2° to 50° C.;

(b) mixing an aqueous solution of at least one compound selected from the group consisting of alkali metal hydroxides, water-soluble organic bases, water-soluble silicates of alkali metal hydroxide and water-soluble silicates of water-soluble organic base with the liquid obtained in step (a) in a molar ratio of $SiO_2/M_2O$ from 20 to 200, where $SiO_2$ indicates the total silica content derived from said active silicic acid and the silica content of said water-soluble silicate, and M indicates an alkali metal atom of said alkali metal hydroxide or an organic base molecule of said water-soluble organic base at 2° to 50° C.;

(c) heating the liquid obtained in step (b) at 60° to 250° C. for 0.5 to 40 hours, whereby to form a stable sol of colloidal silica; and then (d) removing anions and water from the sol obtained in step (c) to provide an anion concentration of 0.1% by weight or less and an $SiO_2$ concentration of from 1 to 30% by weight in the sol.

28. The method of claim 27 for preparing a stable alkaline aqueous silica sol, wherein the aqueous colloidal liquid of an active silicic acid in step (a) is one obtained by bringing an aqueous solution of sodium water glass having a molar ratio of $SiO_2/Na_2O$ from 1 to 4.5 and an $SiO_2$ concentration of from 1 to 6% by weight into contact with a cationic exchange resin in the hydrogen form.

29. The method of claim 27 for preparing a stable alkaline aqueous silica sol, wherein the water-soluble salt of calcium or magnesium in step (a) is at least one selected from the group consisting of calcium chloride, magnesium chloride, calcium nitrate, magnesium nitrate, magnesium sulfate, calcium sulfamate, magnesium sulfamate, calcium formate, magnesium formate, calcium acetate, and magnesium acetate.

30. The method of claim 27 for preparing a stable alkaline aqueous silicic sol, wherein the compound in step (b) is at least one selected from the group consisting of sodium hydroxide, potassium hydroxide, lithium hydroxide, tetraethanolammonium hydroxide, monomethyltriethanolammonium hydroxide, tetramethylammonium hydroxide, monoethanolamine, diethanolamine, triethanolamine, N,N-dimethyldiethanolamine, N-(β-aminomethyl)ethanolamine, N-methylethanolamine, propanolamine, morpholine, silicates of organic base, sodium silicate and potassium silicate.

31. The method of claim 27 for preparing a stable alkaline aqueous silica sol, further including a step of adding at least one compound selected from the group consisting of alkali metal hydroxides, water-soluble organic bases, water-soluble silicates of alkali metal hydroxide and water-soluble silicates of water-soluble organic base to the silica sol obtained in step (d) so as to keep said molar ratio of $SiO_2/M_2O$ in the sol within the range of from 20 to 200.

32. The method of claim 31 for preparing a stable alkaline aqueous silica sol, wherein the compound added in said further step is at least one selected from the group consisting of sodium hydroxide, potassium hydroxide, lithium hydroxide, tetraethanolammonium hydroxide, monomethyltriethanolammonium hydroxide, tetramethylammonium hydroxide, monoethanolamine, diethanolamine, triethanolamine, N,N-dimethyldiethanolamine, N-(β-aminomethyl)ethanolamine, N-methylethanolamine, propanolamine, morpholine, silicates of organic base, sodium silicate and potassium silicate.

* * * * *